Nov. 4, 1958  P. E. KLEINEBERG  2,858,948
MACHINE FOR OPERATING ON BOOKS
Filed May 10, 1952  15 Sheets-Sheet 2
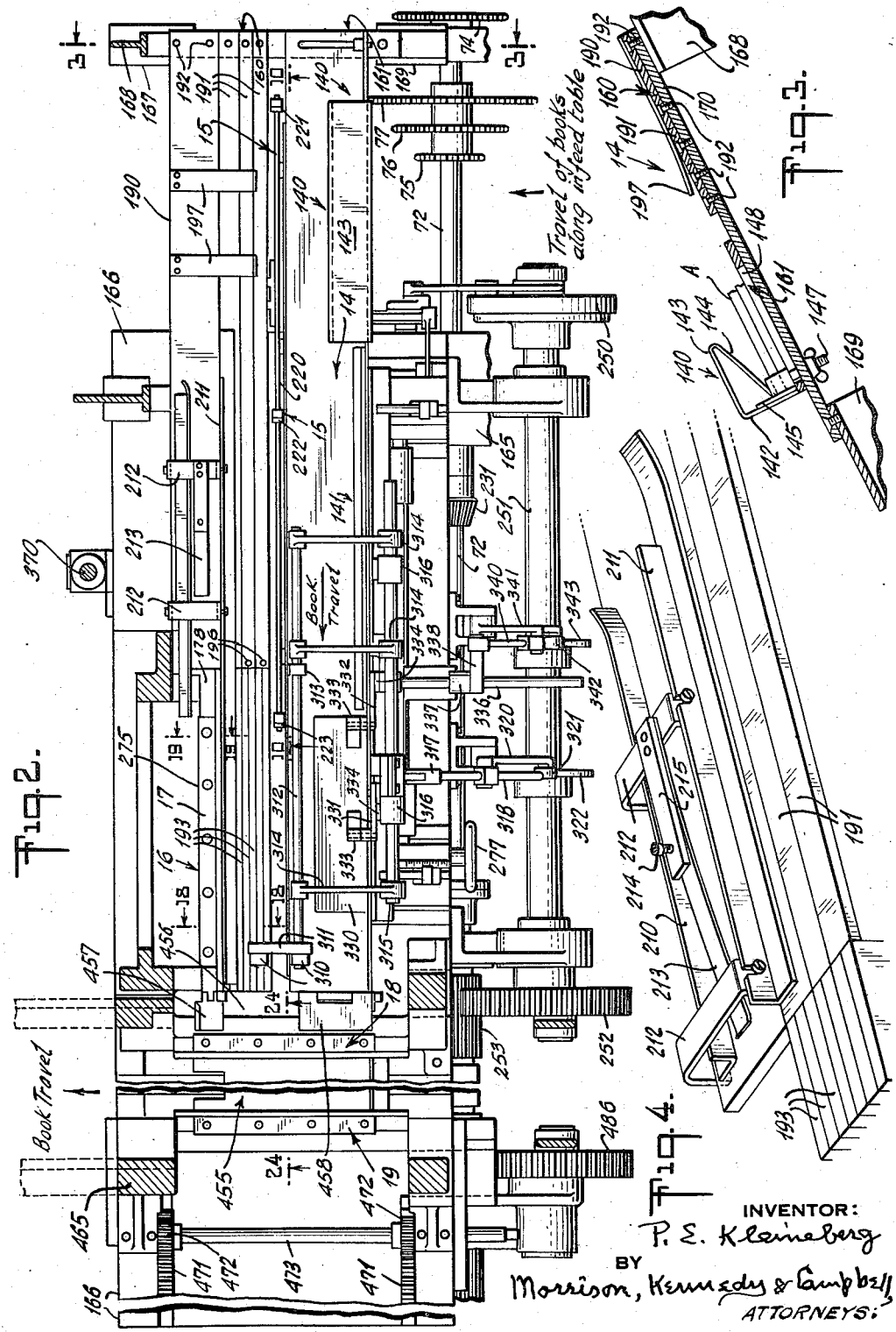
INVENTOR:
P. E. Kleineberg
BY
Morrison, Kennedy & Campbell
ATTORNEYS Nov. 4, 1958 P. E. KLEINEBERG 2,858,948
MACHINE FOR OPERATING ON BOOKS
Filed May 10, 1952 15 Sheets-Sheet 3
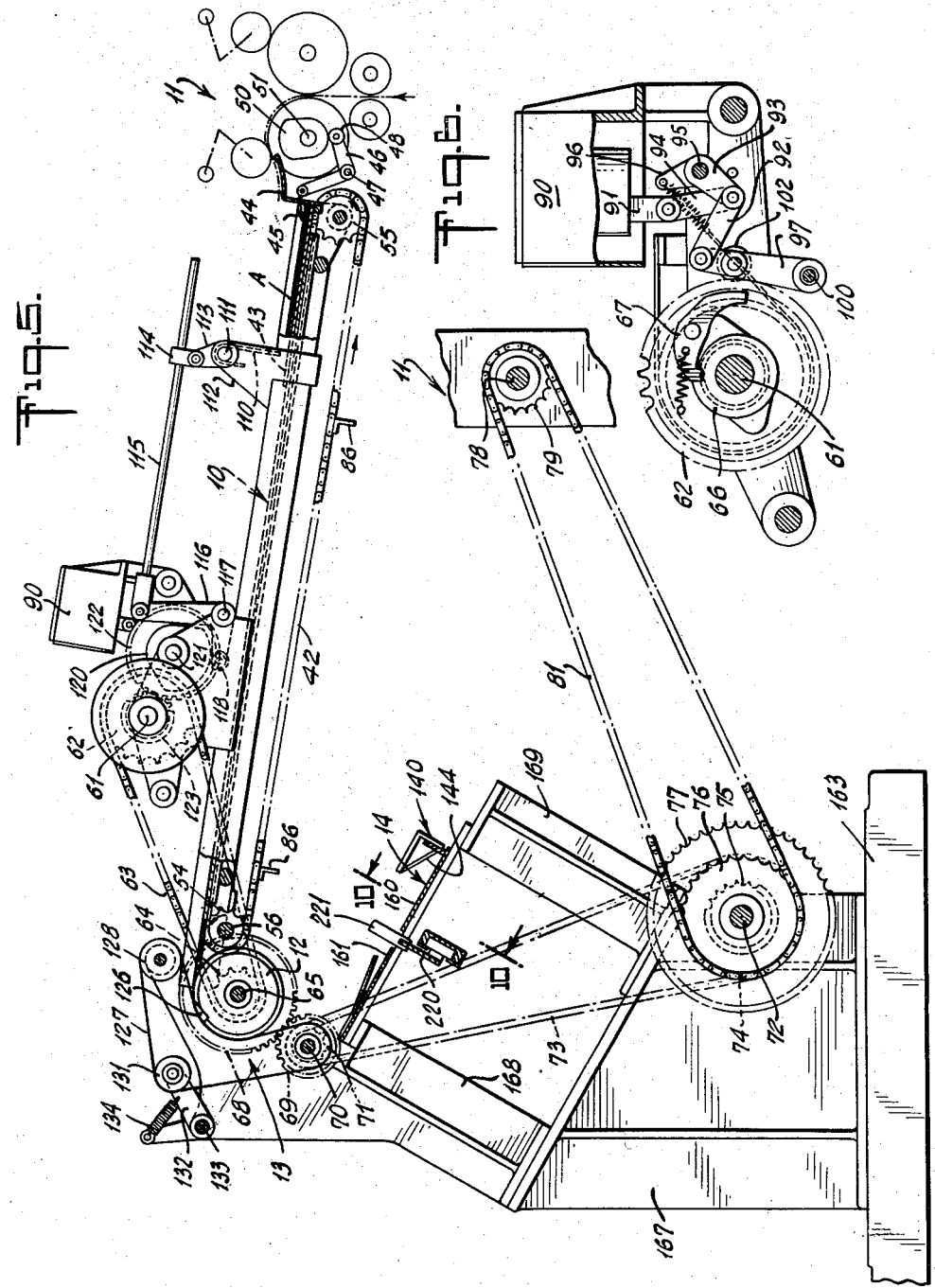
INVENTOR:
P. E. Kleineberg
BY
Morrison, Kennedy & Campbell,
ATTORNEYS.

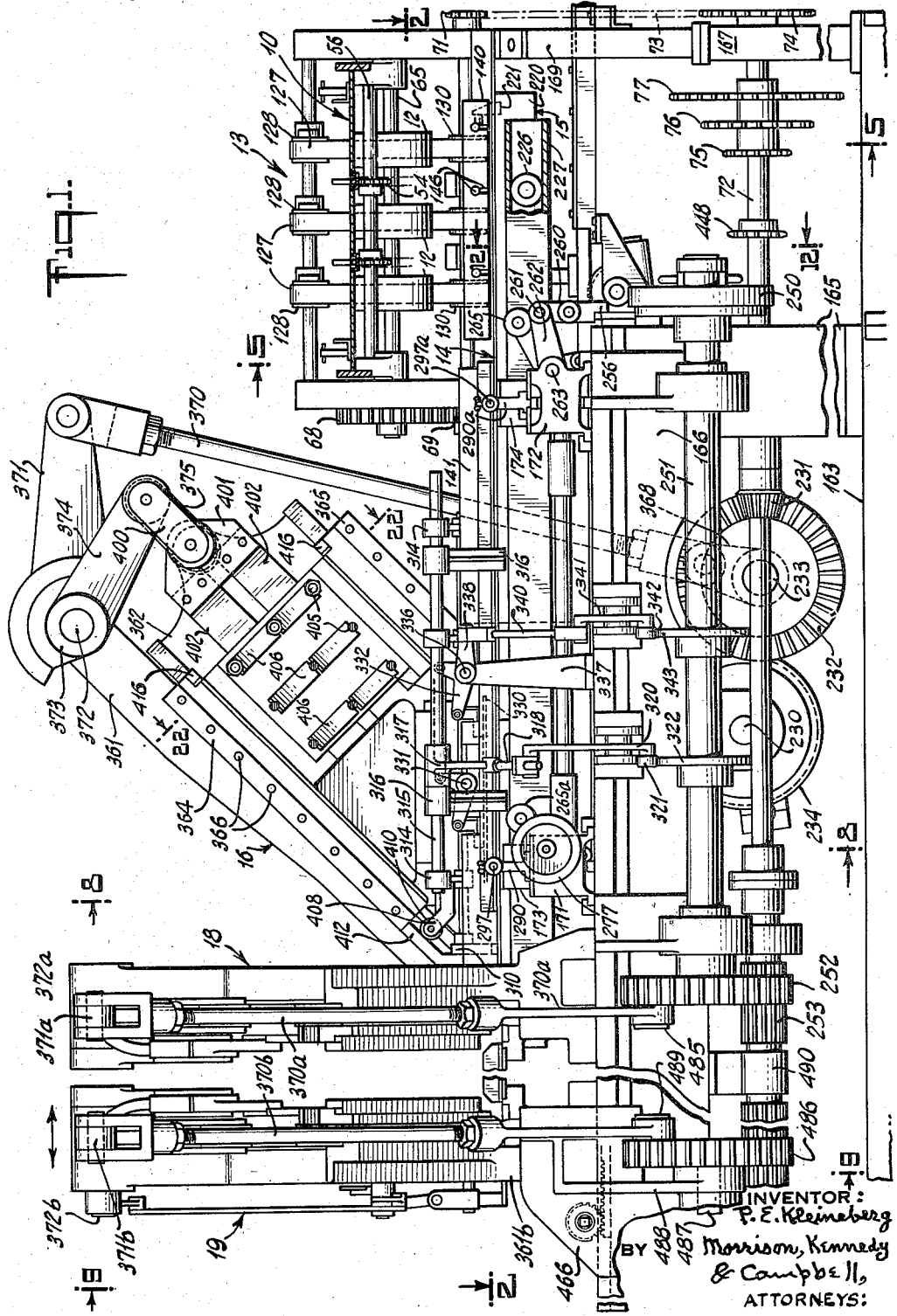

Nov. 4, 1958   P. E. KLEINEBERG   2,858,948
MACHINE FOR OPERATING ON BOOKS
Filed May 10, 1952   15 Sheets-Sheet 4
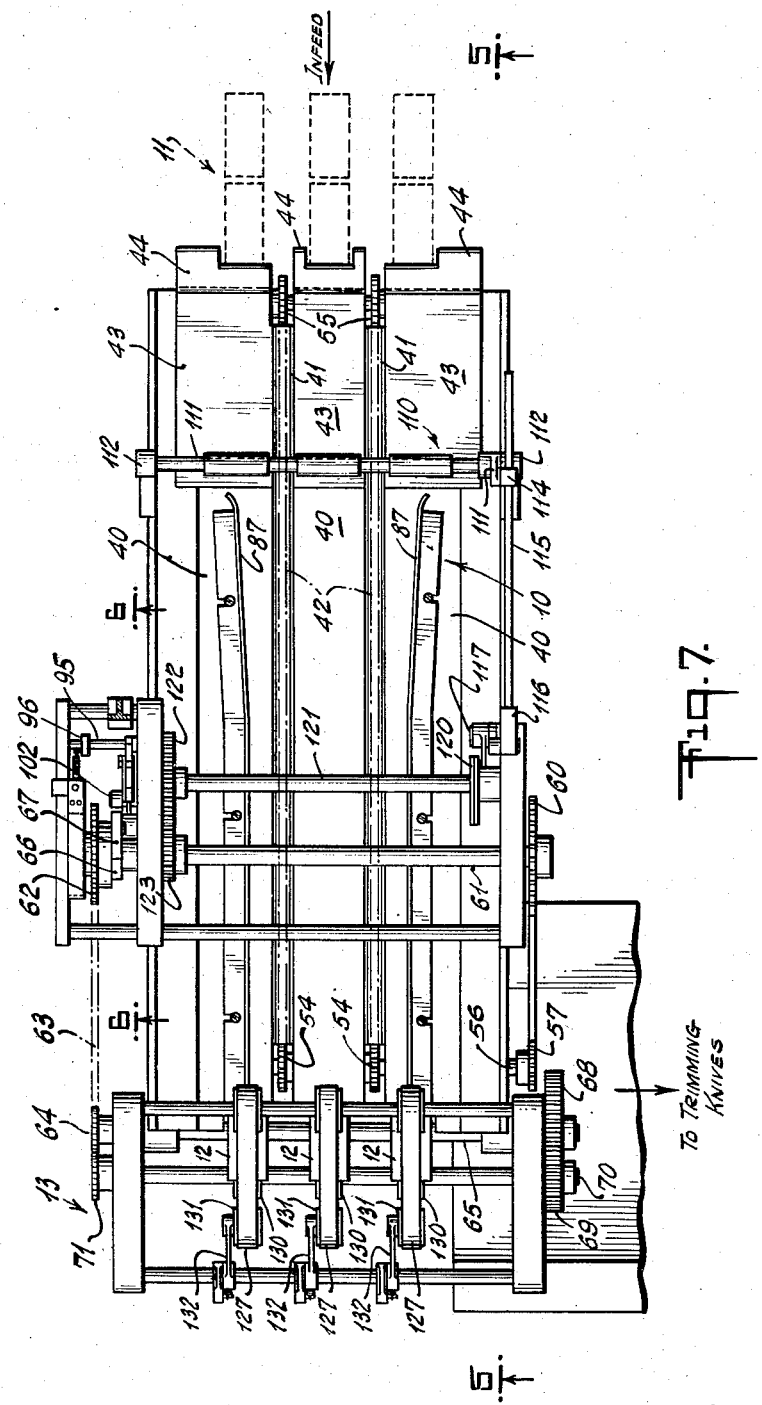

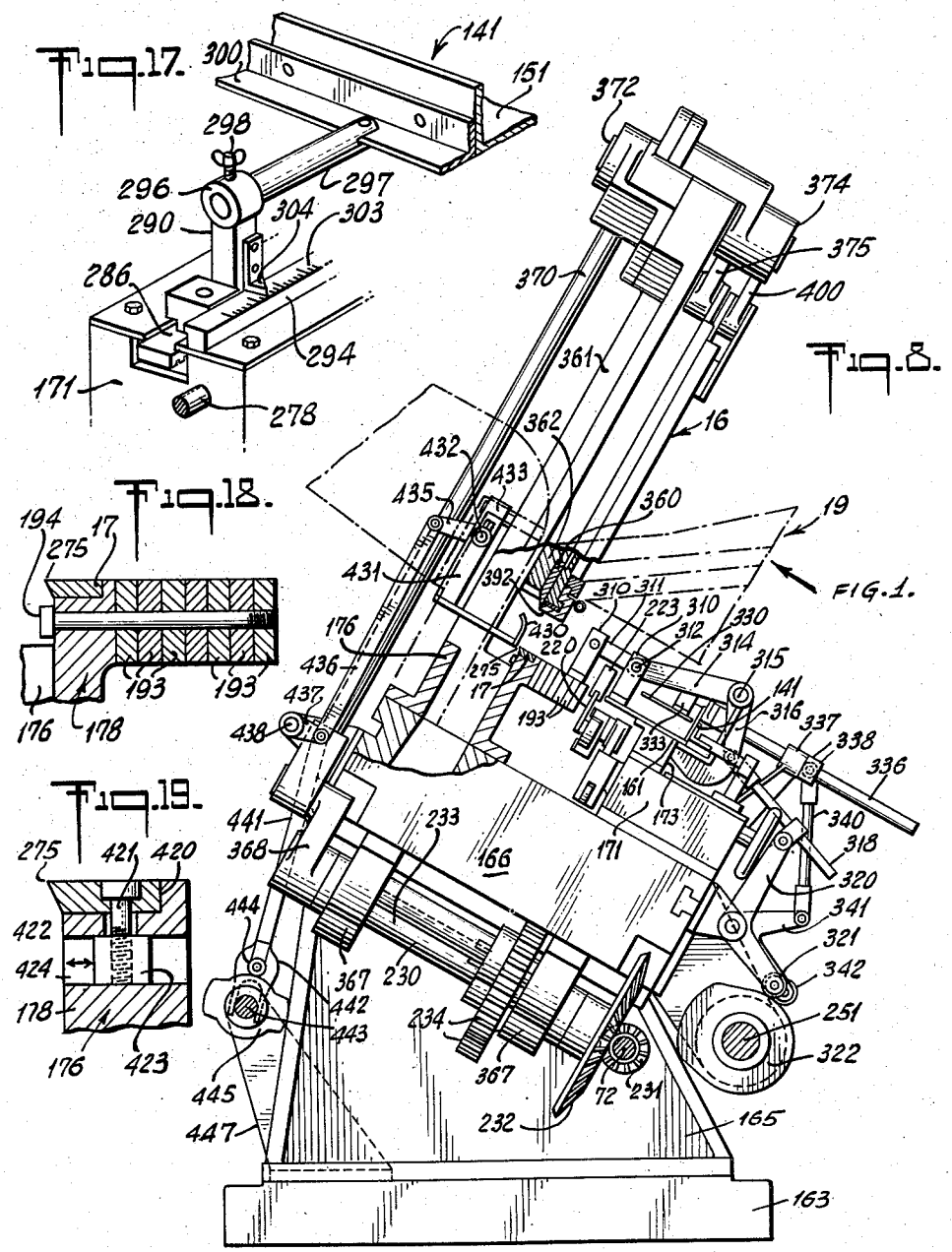

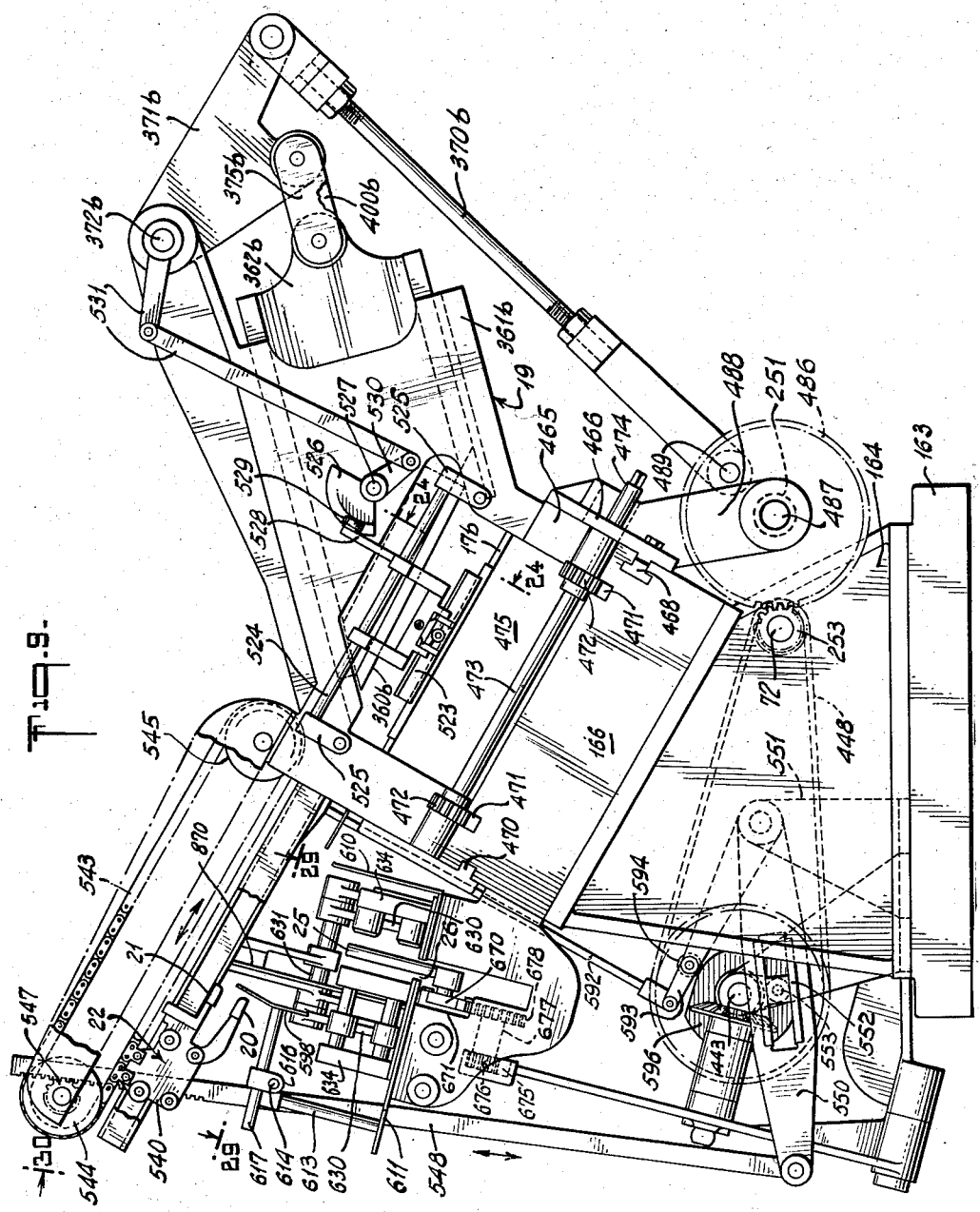

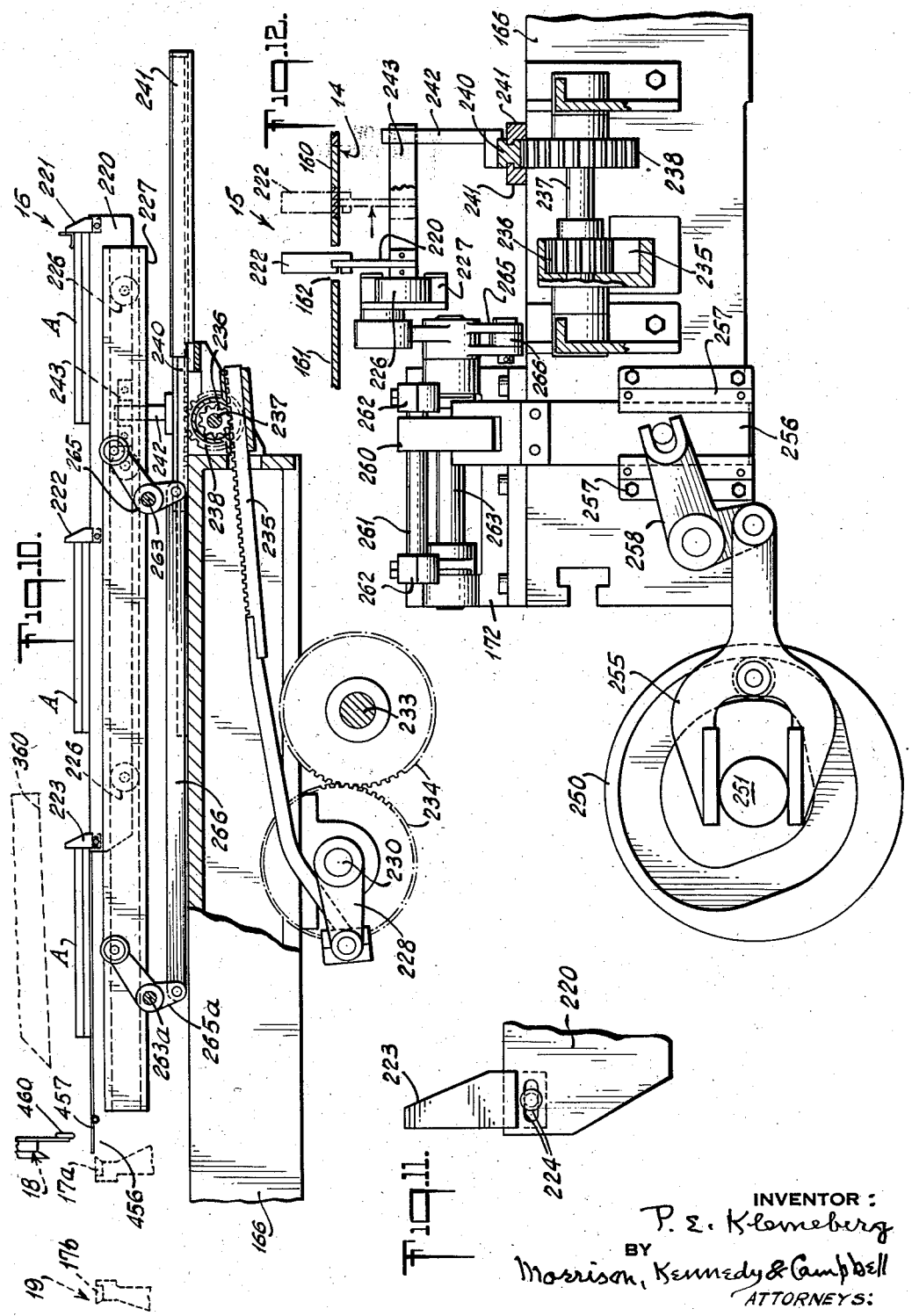

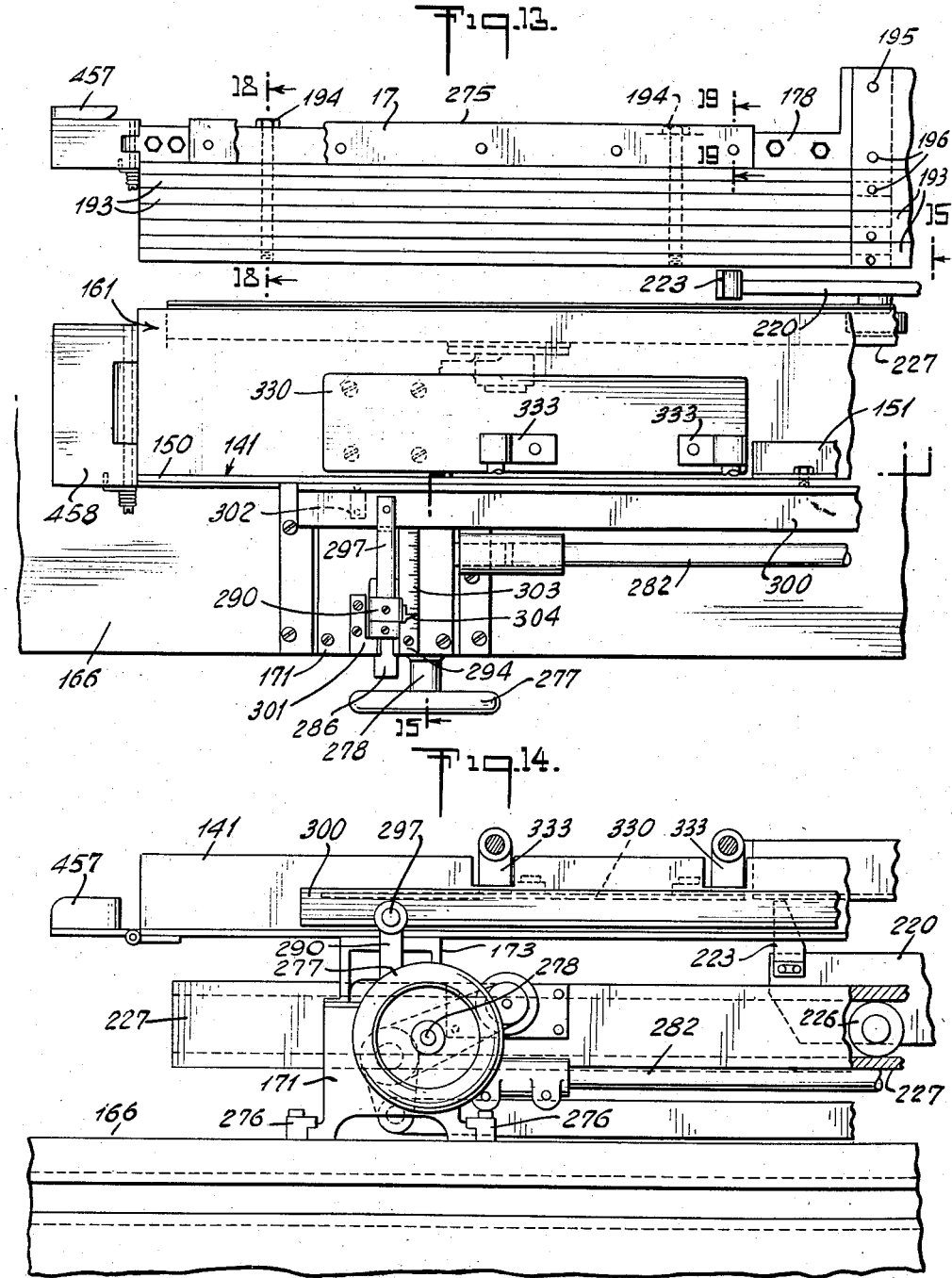

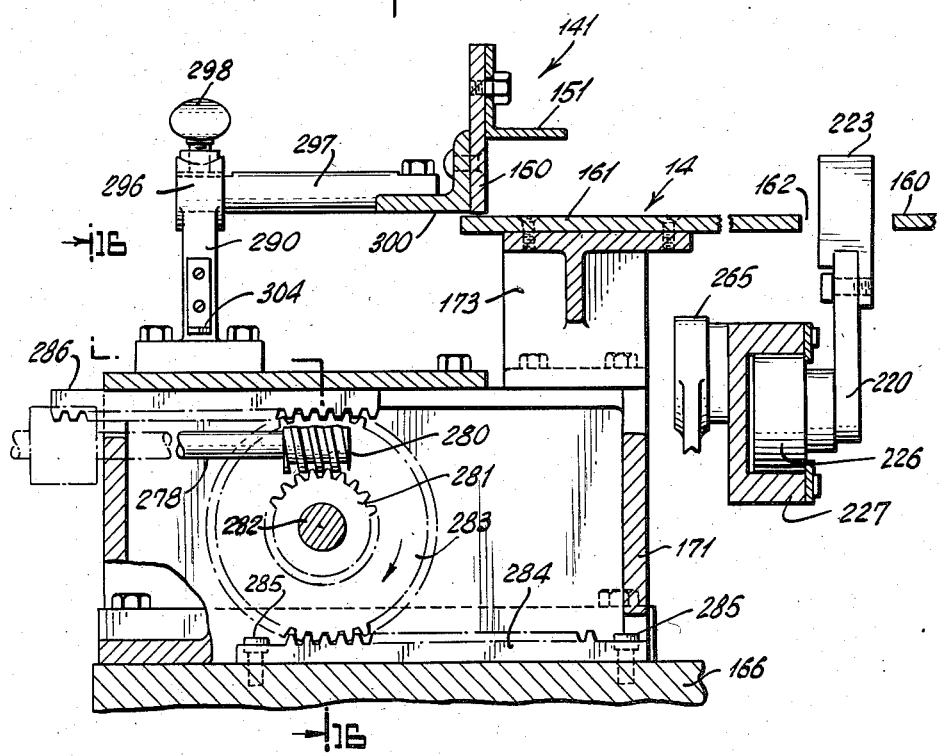
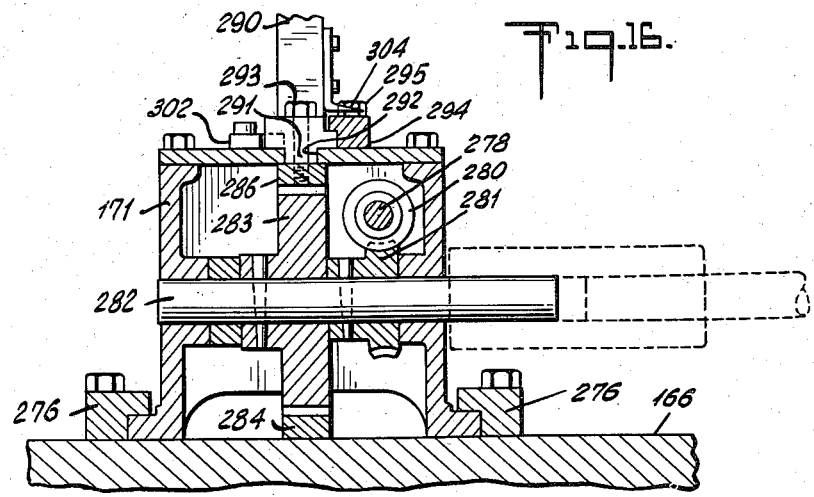

Nov. 4, 1958 P. E. KLEINEBERG 2,858,948
MACHINE FOR OPERATING ON BOOKS
Filed May 10, 1952 15 Sheets-Sheet 10
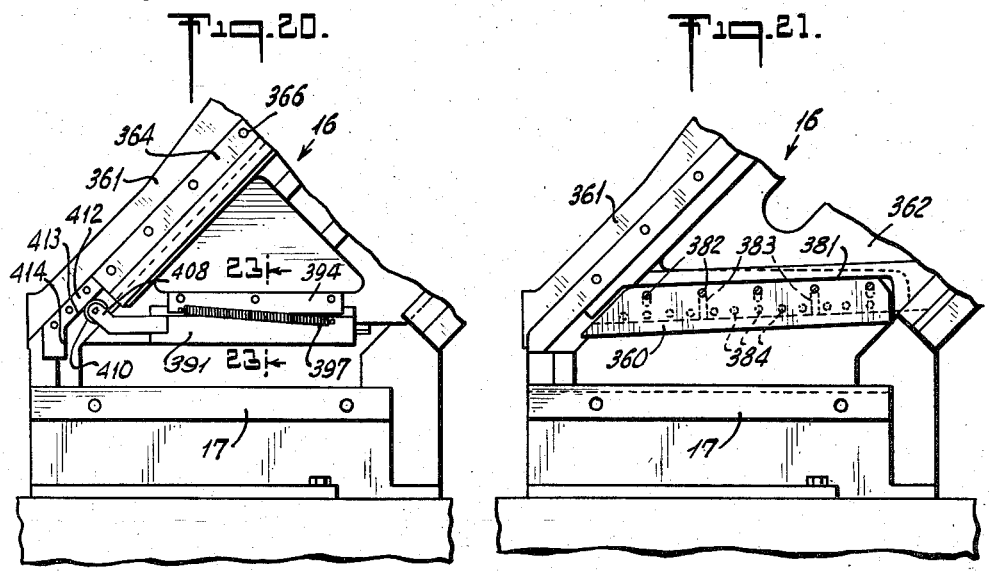
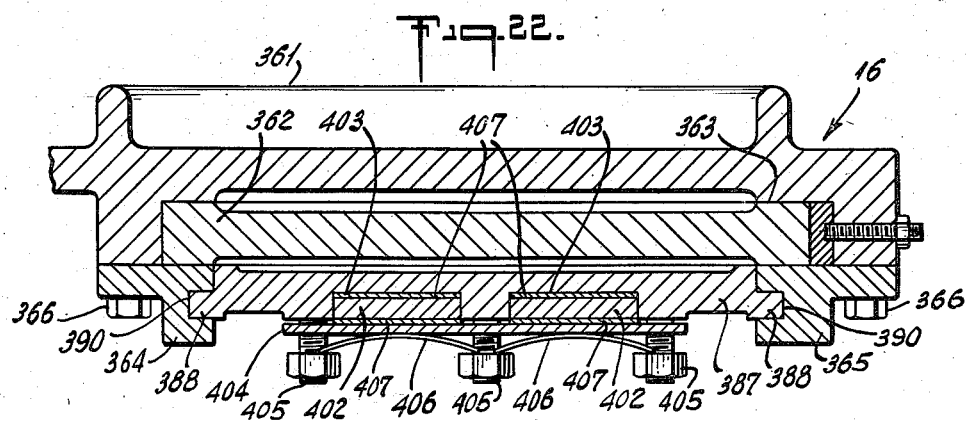
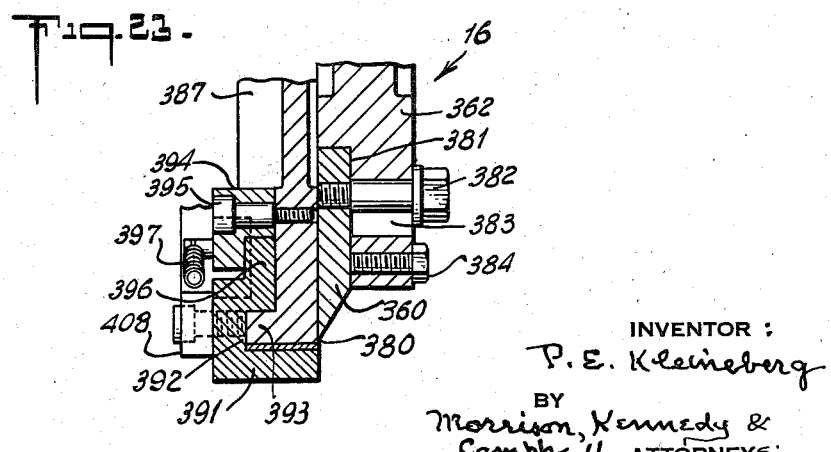
INVENTOR:
P. E. Kleineberg
BY
Morrison, Kennedy &
Campbell, ATTORNEYS.

Nov. 4, 1958  P. E. KLEINEBERG  2,858,948
MACHINE FOR OPERATING ON BOOKS
Filed May 10, 1952  15 Sheets-Sheet 11
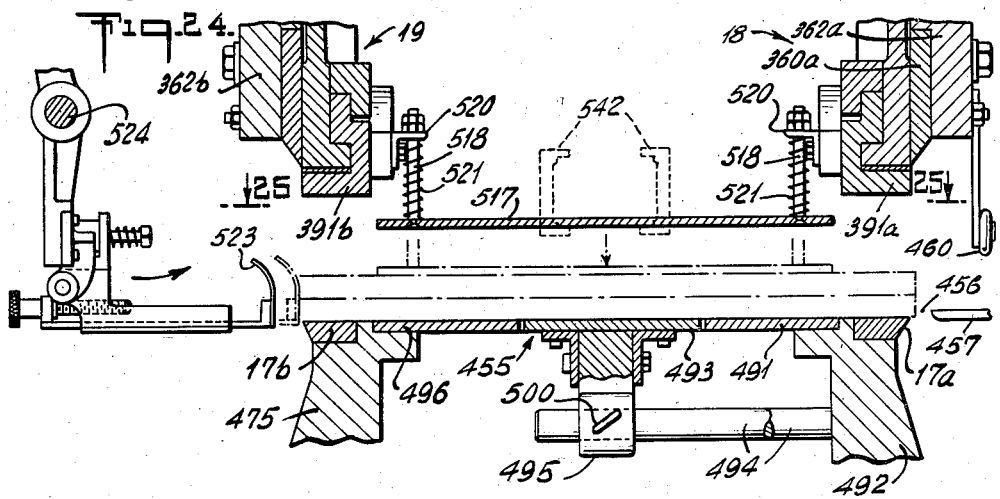
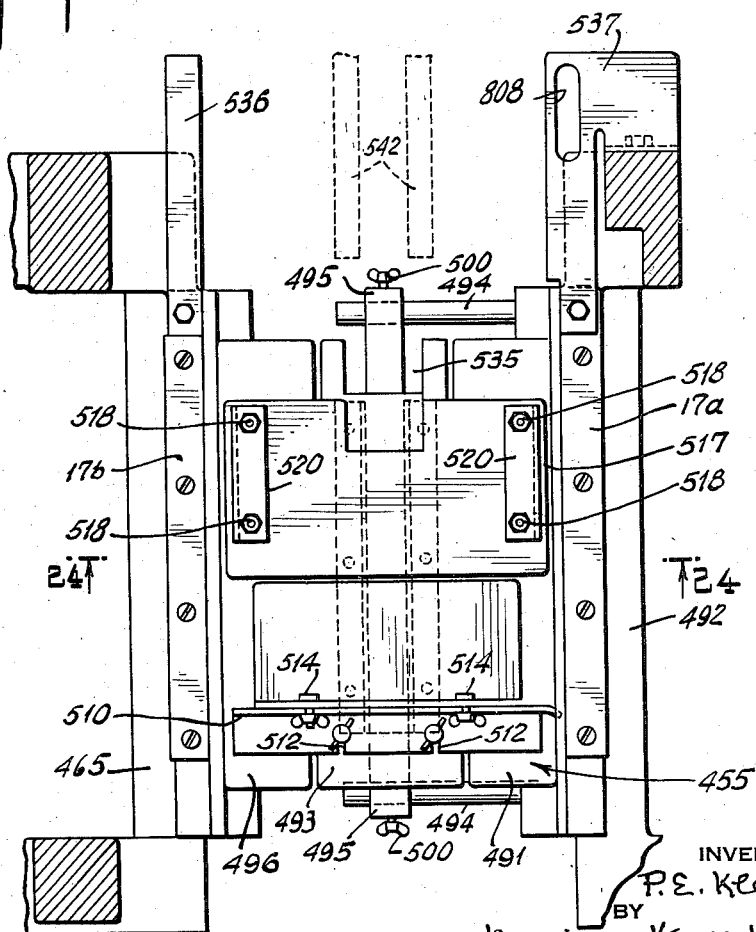
INVENTOR:
P. E. Kleineberg
BY
Morrison, Kennedy & Campbell, ATTORNEYS:

Nov. 4, 1958 P. E. KLEINEBERG 2,858,948
MACHINE FOR OPERATING ON BOOKS
Filed May 10, 1952 15 Sheets-Sheet 12
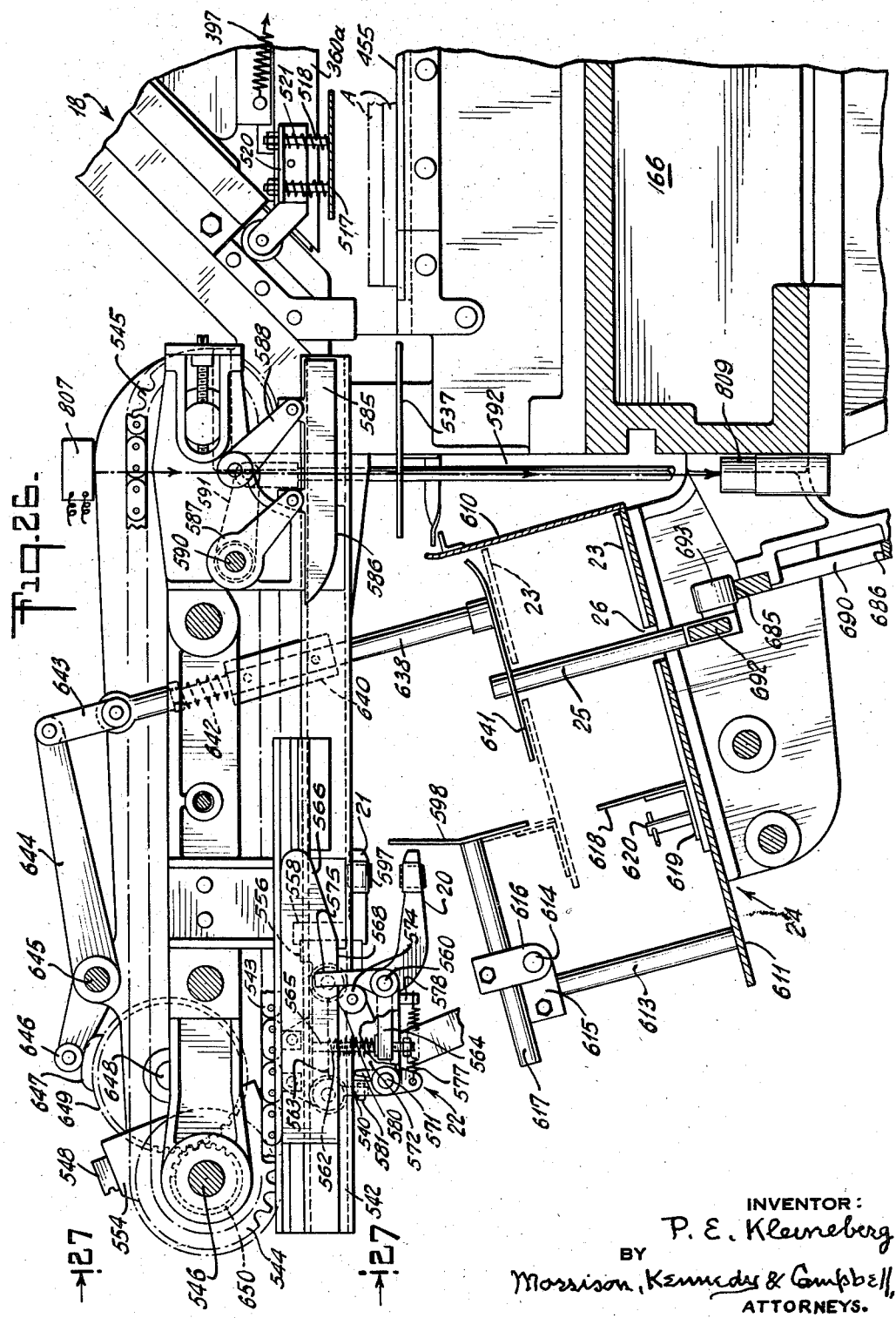

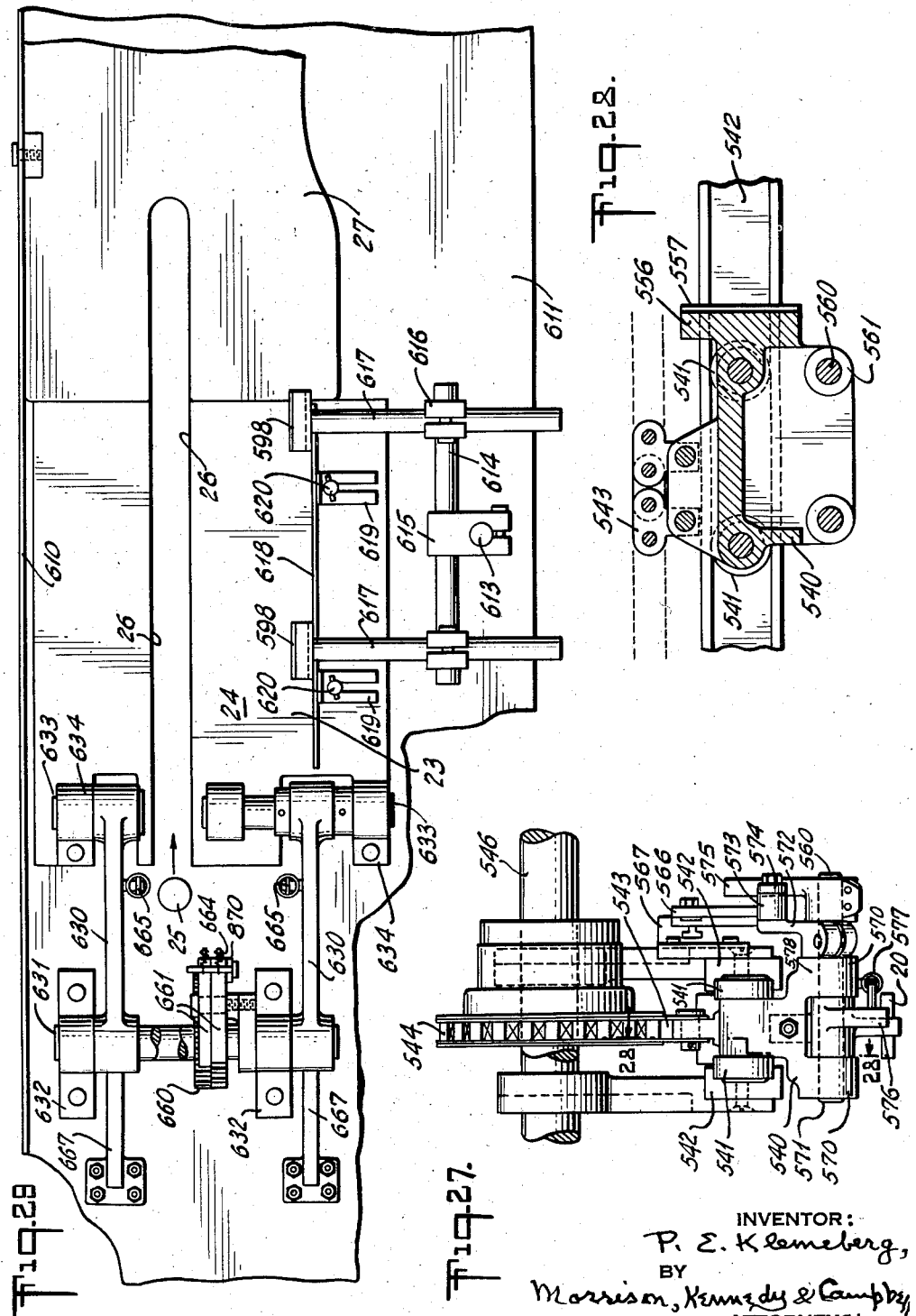

Nov. 4, 1958  P. E. KLEINEBERG  2,858,948
MACHINE FOR OPERATING ON BOOKS
Filed May 10, 1952  15 Sheets-Sheet 14
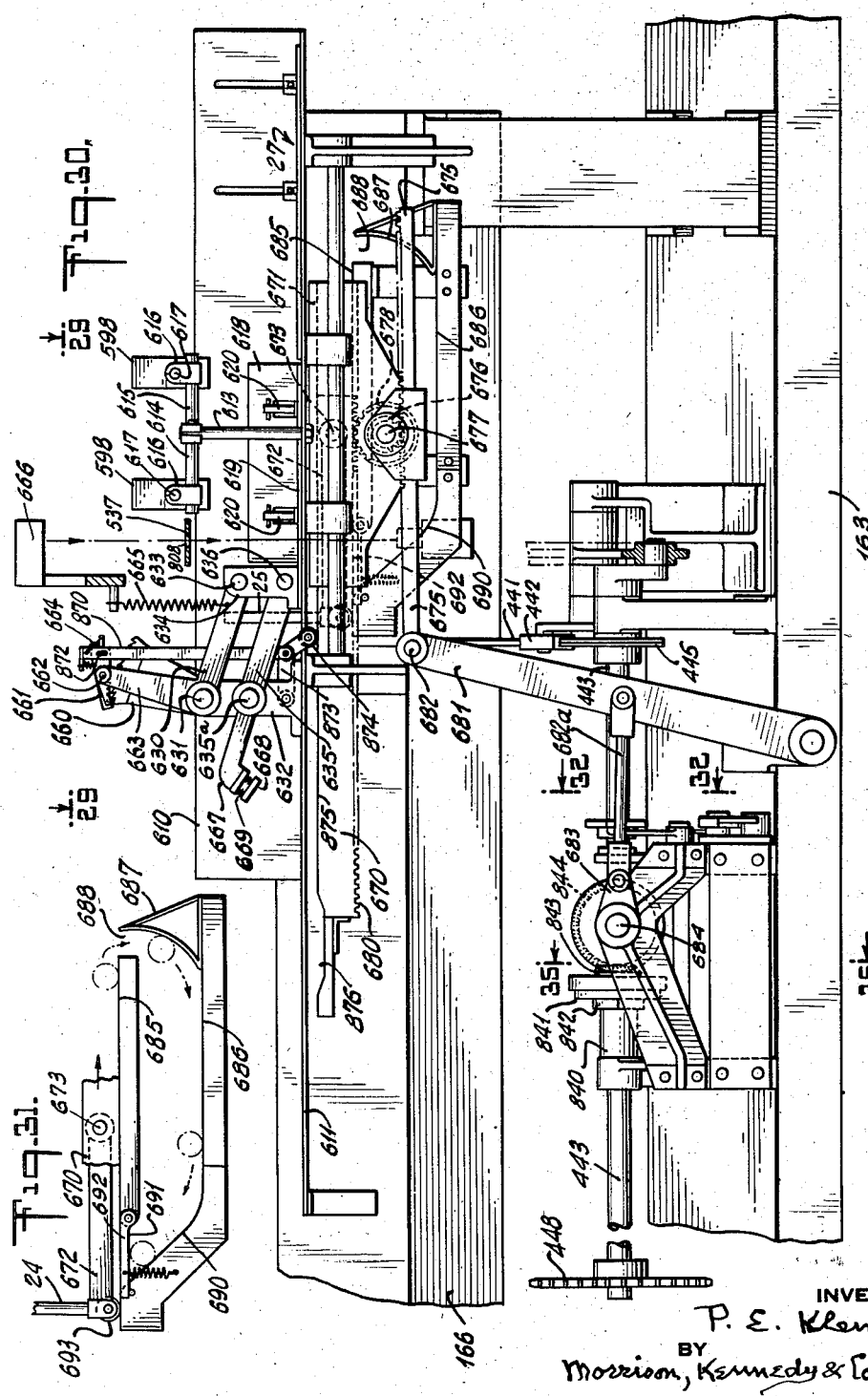
INVENTOR:
P. E. Kleineberg,
BY Morrison, Kennedy & Campbell,
ATTORNEYS.

Nov. 4, 1958 P. E. KLEINEBERG 2,858,948
MACHINE FOR OPERATING ON BOOKS
Filed May 10, 1952 15 Sheets-Sheet 15
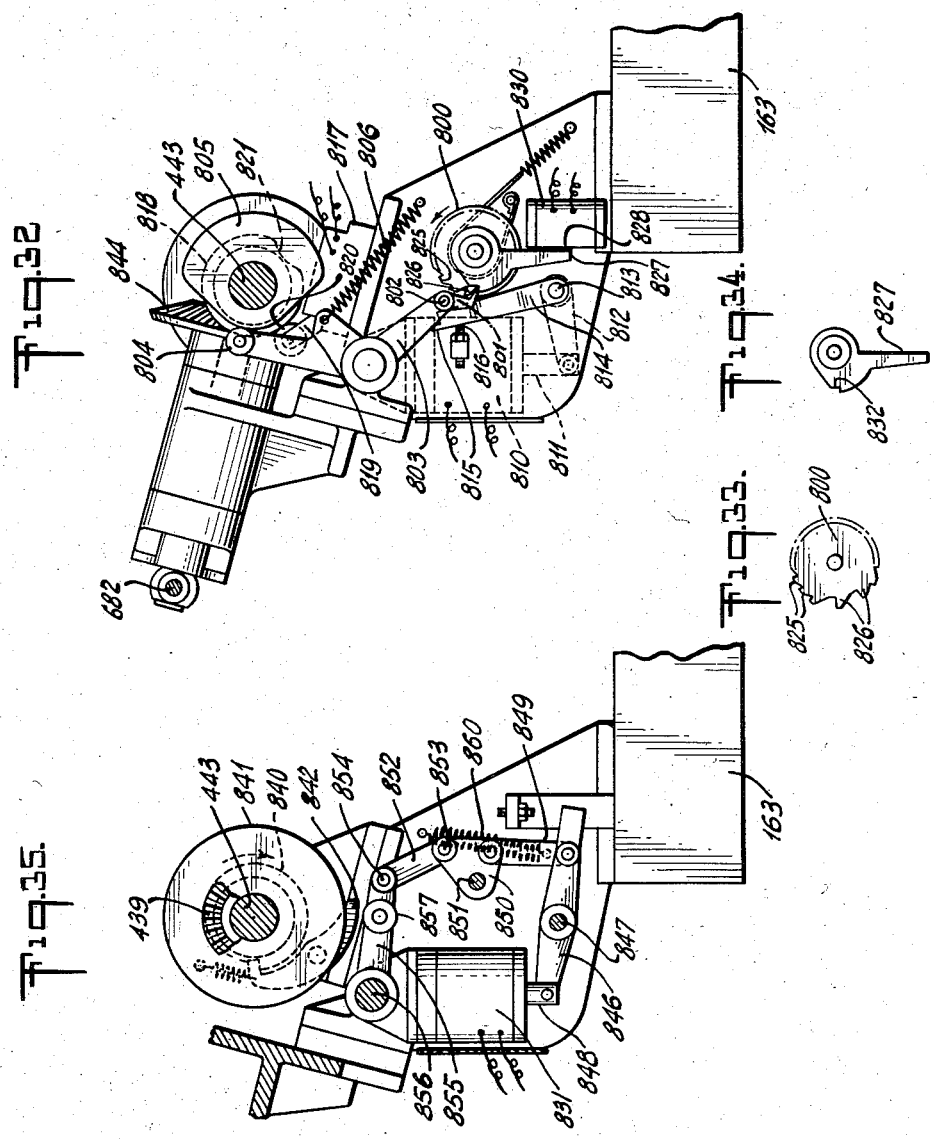
INVENTOR:
P. E. Kleineberg
BY
Morrison, Kennedy & Campbell,
ATTORNEYS.

United States Patent Office 2,858,948
Patented Nov. 4, 1958

2,858,948

MACHINE FOR OPERATING ON BOOKS

Paul E. Kleineberg, Easton, Pa., assignor to T. W. & C. B. Sheridan Company, New York, N. Y., a corporation of New York Application May 10, 1952, Serial No. 287,204

19 Claims. (Cl. 214—6)

The present invention relates to a machine for operating on books, such as a book trimming machine.

One object of the present invention is to provide a new and improved mechanism for removing the books from an operating station, such as trimming station and for collecting them into a pile for discharge. For that purpose, there is provided a collecting shelf or platform, a book gripping mechanism reciprocable to transfer the books to said platform as they are trimmed at the trimming station, and means for automatically lowering the platform to a new position after each transfer operation by an amount equivalent substantially to the thickness of the book or books deposited by said transfer operation, to maintain a constant drop for the books deposited on to said platform.

Another object is to provide new and improved means for collecting a procession of books into a pile after they have been operated upon, for discharging the piled books to a discharge station, each time a predetermined counted number of these books has been collected, and for maintaining a correct count of the collected books before discharge, in spite of any interruption in the procession of books, due for example to rejection and ejection of imperfect books. This object is maintained by a sensing device for controlling the counting mechanism, operable in response to the procession of books from an operating station, such as a trimming station, said sensing device being responsively operable to interrupt the action of the counting mechanism, when this procession is interrupted.

Various other objects, features and advantages of the present invention are apparent from the following particular description and from the accompanying drawings, in which:

Fig. 1 is a front elevation of a book trimming machine in which the features of the present invention may be incorporated, the right hand infeed side of the machine being shown in vertical section, so that the forepart of the infeed section of the machine is not shown;

Fig. 2 is a horizontal section of the machine taken along lines 2—2 of Fig. 1;

Fig. 3 is a detail section of the right hand end of the trimming table of the machine along which the books are conveyed in their passage toward the trimming devices, the section being taken along lines 3—3 of Fig. 2 but on a larger scale;

Fig. 4 is a perspective of a detail portion of the trimming table of the machine, and shows the drag or brake device by which the momentum of the books as they are being conveyed towards the trimming devices is controlled;

Fig. 5 is a section taken along lines 5—5 of Fig. 1 and of Fig. 7 and shows mainly the infeed table, the main or trimming table along which the books are conveyed towards the trimming devices and the drive coupling between the trimming machine and the binding machine;

Fig. 6 is a side elevation partly in section taken along lines 6—6 of Fig. 7 of the control device for releasing the stacked books for travel along the infeed table at proper intervals according to the number of books to be collected in each stack;

Fig. 7 is a plan view of the infeed portion of the machine;

Fig. 8 is a section of the machine taken along lines 8—8 of Fig. 1;

Fig. 9 is a left side elevation of the machine as viewed along the lines 9—9 of Fig. 1;

Fig. 10 is a detail view of the conveyor bar mechanism for moving the stacked books along the trimming table towards the trimming devices, taken approximately along the lines 10—10 of Figs. 2 and 5;

Fig. 11 is a detail view of the conveyor pusher pin or lug constituting part of the conveyor bar mechanism illustrated in Fig. 10 but shown on a larger scale;

Fig. 12 is a detail view of the conveyor bar mechanism taken on lines 12—12 of Fig. 1;

Fig. 13 is a top plan detail view of the mechanism for adjusting the trimming table and the conveyor bar mechanism to accommodate books of different widths;

Fig. 14 is a front detail view of the mechanism of Fig. 13 for adjusting the trimming table and the conveyor bar mechanism to accommodate books of different widths;

Fig. 15 is a detail section of the mechanism of Fig. 14 for adjusting the trimming table and the conveyor bar mechanism taken along the lines 15—15 of Fig. 13 but shown on a larger scale;

Fig. 16 is a detail section of the mechanism of Fig. 13 for adjusting the trimming table and the conveyor bar mechanism taken along the lines 16—16 of Fig. 15;

Fig. 17 is a perspective of a detail section of the table adjusting mechanism shown in Figs. 13 and 14;

Fig. 18 is a detail section of the stationary shear knife of the first trimming device and its table support, taken approximately along the lines 18—18 of Fig. 2 but on a larger scale;

Fig. 19 is a detail section of the stationary shear knife of the first trimming device and its adjusting support taken approximately along the lines 19—19 of Fig. 2 but on a larger scale and along the lines 19—19 of Fig. 13;

Fig. 20 is a detail front elevation of the first trimming device;

Fig. 21 is a detail front elevational view of the first trimming device similar to that shown in Fig. 20, except that the book clamp associated with the movable knife of said device has been removed from said view;

Fig. 22 is a section of the first trimming device taken along the lines 22—22 of Fig. 1 but shown on a larger scale;

Fig. 23 is a detail section of the trimming device taken along the lines 23—23 of Fig. 20 but shown on a larger scale;

Fig. 24 is a detail section of the second and third trimming devices and associated mechanisms taken approximately along lines 24—24 of Fig. 2 but on a larger scale and approximately along the lines 24—24 of Fig. 25;

Fig. 25 is a detail section of the second and third trimming devices and associated mechanisms taken approximately along lines 25—25 of Fig. 24;

Fig. 26 is an enlarged detail view of Fig. 9 partly in section but turned counterclockwise and shows particularly the collecting mechanism for collecting the stacked books and the gripper mechanism for transferring to the book supporting shelf or platform of said collecting mechanism, each stack of books from the station of the second and third trimming devices, upon completion of the trimming operation at said station;

Fig. 27 is a rear view of the gripper mechanism of Fig. 26 taken along the lines 27—27 of Fig. 26;

Fig. 28 is a section of the carriage carrying the gripper elements of the gripper mechanism and is taken approximately along the lines 28—28 of Fig. 27;

Fig. 29 is a top plan view of parts of the collecting mechanism and the delivery or unloading mechanism for discharging the books therefrom to a delivery or discharge station after a counted number of trimmed books have been collected on the book supporting platform of said collecting mechanism, said view being taken approximately along the lines 29—29 of Fig. 9 and of Fig. 30 but on a larger scale;

Fig. 30 is a rear view of the machine showing parts of the collecting mechanism, delivery or discharge mechanism and counting mechanism taken approximately along the lines 30—30 of Fig. 9;

Fig. 31 is a detail view of the discharge pusher device of the delivery or discharge mechanism of Fig. 30 for pushing the collected books from the platform of the collecting mechanism to the delivery or discharge station after a predetermined counted number of trimmed books have been collected in said latter mechanism;

Fig. 32 is a section of the book counting mechanism taken along lines 32—32 of Fig. 30;

Fig. 33 is a face view of the ratchet wheel forming part of the counting mechanism of Fig. 32;

Fig. 34 is a face view of the control lever forming part of the counting mechanism of Fig. 32; and Fig. 35 is a section of the drive part of the counting mechanism taken along the lines 35—35 of Fig. 30.

General arrangement and operation of the machine

The untrimmed books with soft or flexible covers or with outer flexible sheet elements such as magazines or pamphlets after being bound in a binding machine, such as a so-called covering machine or a so-called saddle stitcher, are delivered singly and successively to the trimming machine of the present invention, where they are arranged at the start in predetermined numbers of 1, 2 or more books, and while so arranged are conveyed from the infeed station to the collecting station through the field of operations of the different trimming devices, where the books are trimmed on their three sides at their front, head (top) and tail (foot) edges.

Referring specifically to Figs. 5 and 7 of the drawings, the untrimmed books are delivered to the infeed table 10 of the trimming machine of the present invention from the binding machine 11, the delivery end only of said binding machine being shown in Fig. 5. These books are delivered from the binding machine 11 onto the infeed table 10 singly and successively, with the rear bound edges of the books disposed forwardly in leading position and are deposited at the intake end of said infeed table, where they are retained until a predetermined number of one, two or more books has been assembled. The books so assembled are then conveyed along the infeed table 10 towards the left (Fig. 5), carried around the belted drums 12 of a transfer mechanism 13 and deposited onto the intake end of the trimming table 14 (Figs. 1, 2, 5, 7 and 8).

The stacked books deposited on the trimming table 14 are transported by a conveyor bar mechanism 15 along said trimming table from one end thereof towards the left (Figs. 1 and 2) with the rear bound edges of said books extending and guided along the front edge of said table (downwardly when viewed in Fig. 2), until the books reach near other end of said trimming table where a first trimming device 16 (Figs. 1 and 8) is stationed. At this first trimming station, the books are held temporarily in position by a pause in the advancing operation of the conveyor bar mechanism 15, while the trimming device 16 comes into play to trim the front edges of the stack of books against the cutting edge of a fixed shear knife 17 (Figs. 2 and 8) forming part of said trimming device.

After trimming off the front edges of the stack of books, the books are advanced by the conveyor bar mechanism 15 into the field operation of a second trimming device 18 and a third trimming device 19 (Figs. 1, 2, 9 and 26) where the head (top) and tail (foot) edges of the books are trimmed simultaneously. The station where the second trimming device 18 and the third trimming device 19 operate, serve not only as a trimming station but also as a transfer station from which the books, after being trimmed or otherwise operated upon, are transferred to a collecting station.

The stacked books trimmed as described are then picked up by the gripper jaws 20 and 21 of a delivery mechanism 22 (Figs. 9 and 26) and transferred from the transfer station where the last trimming operation takes place onto the shelf or platform 23 of a collecting mechanism 24.

The operations described are continued and repeated until a counted number of trimmed books have been collected onto the platform 23, whereupon a post 25 (Figs. 9, 26, 29 and 30) passing through a slot 26 in said platform is actuated to push the collected books from said shelf towards the right (Figs. 29 and 30) onto a final delivery station 27.

Infeed mechanism

Referring to Figs. 5 and 7, the infeed table slants from the delivery end of the binding machine 11 upwardly towards the transfer mechanism 13, which transfers the books from the discharge end of the infeed table to the intake end of the trimming table 14. This infeed table 10 comprises three plates 40 transversely interspaced to receive therebetween channels 41 rigid with said plates and serving as runners or supports for the upper flights or runs of respective infeed conveyor chains 42 and stacking plates 43 at the intake end of the table secured to said plates 40 respectively and serving by their elevated position to support the deposited books A above said chain runs.

The bound books are delivered singly and successively from the binding machine 11 onto the elevated stacking plates 43 of the infeed table 10 in any suitable manner, with the bound edges of the books leading. In the specific form shown, at the entrance to the infeed table, there is provided a series of guides or chutes 44 for dropping the books onto the stacking plates 43 as they are discharged from the binding machine, and a finger 45 secured to one arm of a bell crank 46, pivotally supported at 47 to a fixed bracket. The other arm of the bell crank 46 carries a follower 48 spring-pressed against a cam 50 on a stitcher shaft 51, in case the binding machine 11 is a saddle stitcher. As each book is dropped along the chutes 44 onto the stacking plates 43, the finger 45 is moved from inactive position towards the left (Fig. 5) under spring tension and on the top cover or sheet of the book deposited on the stacking plates 43 at the front open edge of the book, to hold said book until the succeeding book has been dropped thereon. This operation serves to hold the cover of the first book, so that it cannot be displaced when the succeeding book slides across it. The inclination of the infeed table 10 aids by gravity in holding the books at the intake end of the table while stacking takes place.

As soon as the second book has been deposited on the first book, the finger 45 is cammed out of holding position with respect to said first book. If a third book is to be stacked on top of the second book, the finger 45 is returned by the cam 50 into position to hold down said second book.

The two infeed conveyor chains 42 are trained around sprockets 54 and 55 (Figs. 5, 6 and 7). For driving these conveyor chains 42, the sprockets 54 are secured to a common shaft 56 carrying a sprocket 57 driven through a chain 58 and a sprocket 60 secured to one end of a shaft 61. The other end of this shaft 61 loosely carries a sprocket 62 which is driven through a chain 63 from a sprocket 64 on one end of a shaft 65 and which drives the shaft 61 through a ratchet 66 and pawl 67, as will be more fully described. The other end of this shaft 65 has secured thereto a gear 68 meshing with a pinion 69 on one end of a shaft 70. The other end of this shaft 70 has a sprocket 71 driven from a shaft 72 (Figs. 1 and 5) constituting the main drive shaft of the trimming machine, through a chain 73 and a sprocket 74 on said main drive shaft 72. This drive shaft 72 carries a change speed device comprising a number of sprockets 75, 76 and 77, three being shown of different diameters, any one of which may be driven from the main shaft 78 of the binding machine 11 through a chain to be described and a sprocket 79 on said shaft 78. The smallest sprocket 75 on the drive shaft 72 of the trimming machine has the same diameter as the sprocket 79 on the main shaft 78 of the binding machine. When this smallest sprocket 75 is connected into the drive, the trimming machine will operate at the same speed as the binding machine, causing thereby only one book to be collected each time at the intake end of the infeed table 10, the books to be conveyed singly in succession through the machine and only one book to be trimmed at each stroke of each trimming device 16, 18 and 19 (Fig. 1). The drive connection for this 1:1 speed ratio is suitable for trimming thick books.

The sprocket 76 on the main shaft 72 of the trimming machine is twice the diameter of the sprocket 79 on the main shaft 78 of the binding machine 11, and when this sprocket 76 is connected into the drive of the trimming machine, this machine will operate at one-half the speed of the binding machine, thereby permitting two books to be stacked at the intake end of the infeed table 10, the books to be advanced through the trimming machine in pairs, and two superposed books to be trimmed simultaneously at each cutting stroke of the trimming devices. This 1:2 drive connection is suitable where the thickness of each book is small enough to justify combining two of such books for each trimming operation.

Similarly, the sprocket 77 is three times the diameter of the sprocket 79 on the main shaft 78 of the binding machine 11 to stack the books in sets of threes.

A conveyor chain of suitable length is trained over the sprocket 79 on the main shaft 78 of the binding machine and over the sprocket 75, 76 or 77 on the drive shaft 72 of the trimming machine selected according to the number of books to be cut at each trimming operation, as already described. In the drawings, the intermediate sprocket 76 is shown connected into the drive of the trimming machine by means of a sprocket chain 81, to accumulate two books at the intake of the infeed table 10 and to cut two superposed books simultaneously at each trimming stroke.

The infeed conveyor chains 42 driven at the proper speed in the manner described have pusher lugs 86 thereon spaced far enough apart on said chains to allow two or more books to accumulate on the intake end of the infeed table 10, according to the sprockets 75, 76 or 77 connected, before said lugs engage the open front edges of the accumulated books. These pusher lugs 86 push each stack of books to the left (Figs. 5 and 7) along the infeed table 10 and as these books are advanced along said table, they are centered transversely of the table by guides 87 flaring at their entry ends and mounted on said table for adjustment transversely thereof according to the lengths of the books being handled.

The infeed conveyor chains 42 are normally operated continuously and are controlled from the binding machine 11, so that upon interruption of the delivery of the books from the binding machine 11, as for example, by reason of rejections of imperfect books in the array of books going through said machine, the operation of said infeed conveyor chains 42 is discontinued, until the next acceptable book comes along, whereupon operation of said chains is resumed. The mechanism for effecting this infeed conveyor chain control comprises the ratchet 66 (Figs. 5, 6 and 7) affixed to the shaft 61 and having a single tooth, and the pawl 67 spring-pressed against said ratchet and pivotally secured to the sprocket 62 which is loose on said shaft. A solenoid 90 controlled by a switch (not shown) which is located on the binding machine 11 and which is operated each time an imperfect book is rejected, has a plunger 91 secured to jointed toggle links 92 and 93 by an arm 94. One of these toggle links 93 is supported on a pivot pin 95 having a fixed axis and carrying a spring-pressed finger 96. The other toggle link 92 is pivotally connected to one end of a trip lever 97, the other end being secured to a rock shaft 100 supported on a fixed axis. This trip lever 97 carries a roller 102 adapted to be moved into and out of engagement with the tail end of the pawl 67.

The solenoid 90 is shown deenergized in inactive position. In this position, the pawl 67 is spring-pressed into engagement with the single tooth of the ratchet 66, the sprocket 62 is thereby locked to the shaft 61 and the infeed conveyor chains 42 are consequently operating. When the solenoid 90 is energized by rejection and ejection of an imperfect book in the binding machine 11, the trip lever 97 is moved counterclockwise (Fig. 6) about the axis of its supporting rock shaft 100, to cause the roller 102 carried by said trip lever to engage the tail end of the pawl 67 and disengage it from the ratchet 66. This interrupts the drive to the infeed conveyor chains 42 and this interruption is continued until the next acceptable book comes along.

Gate means (Figs. 5 and 7) are provided to help superimpose and stack the books at the intake end of the infeed table 10. This gate means comprises a swingable gate 110 made up of three sections secured to a rock shaft 111 which is journalled in bearing brackets 112 adjustably secured to the sides of the infeed table 10 and which extends across the top of the table. This swingable gate 110 is operated by means of a lever 113 pivotally connected to a collar 114 adjustably connected to a link 115 near one end, the other end being connected to one arm of a bell crank 116 pivotally supported on a fixed axis at 117. The other arm of this bell crank 116 carries a roller 118 pressed into follower engagement with a cam 120 by a spring (not shown). This cam 120 is secured to a shaft 121 driven through gears 122 and 123 from the shaft 61, which in turn is driven in a manner already described.

The brackets 112 supporting the rock shaft 111 of the swingable gate 110 are adjustable along the sides of the infeed table 10, as for example by means of clamping screws (not shown) and the collar 114 connecting the link 115 and the lever 113 is adjustable along the link 115, so that said gate is adjustable along the infeed table for different book widths.

During the operation of stacking the required number of books at the intake end of the infeed table 10, the gate 110 is down in the position shown in Fig. 5, so that the books are prevented from accidentally being moved beyond stacking position before being picked up by the push lugs 86 of the infeed conveyor chains 42. At the proper time when the lugs 86 have moved near position to engage the stacked books, the gate 110 is swung by the operation of the cam 120 out of the way of the stacked books to be advanced.

The mechanism 13 (Figs. 1, 5 and 7) for transferring the stacked books from the feed table 10 to the trimming table 14 comprises the drums 12, three being shown, mounted on the common shaft 65, and each having a peripheral notch 126 with a substantially radial shoulder to receive the bound edges of the stacked books therein, the depths of these notches being sufficient to accommodate the stacked books therein without excessive crushing pressure from the endless belts 127 trained about said drums.

Each belt 127 passes over pulleys 128 and 130 mounted for free rotation about fixed axes respectively, and over a tension pulley 131 which is mounted on a lever 132 pivotally supported at 133 to the frame structure of the machine and which is spring-pressed into belt tightening position by a spring 134. The belt 127 is thereby trained partially around the periphery of the corresponding drum 12, so that the stacked books as they are pushed by the conveyor lugs 86 along the infeed table 10 towards the left (Fig. 5) are fed into the retaining notches 126 of the three drums 12 between said drums and the belts 127 and are carried around by the friction hold of said drums and said belts through almost a reverse turn and deposited onto the intake end of the trimming table 14.

*Trimming table*

The trimming table 14 is inclined transversely as shown in Figs. 3, 5, 8 and 9 and at its lower longitudinal front side has aligned back plates or supporting rails 140 and 141 (Figs. 1, 2, 3 and 15) to be more fully described. With the trimming table 14 so inclined, the stacked books will gravitate towards the supporting rails 140 and 141 as they are advanced along said trimming table in the manner to be described, and therefore will be maintained and guided against edgewise turning action by said rails while so advanced. Since the books are delivered to the infeed table 10 with their bound edges leading, the books will be transferred by the mechanism 13 (Figs. 5 and 7) to the trimming table 14, with their bound edges still leading, so that the books will be deposited on the trimming table with the bound rear edges of the boks extending along the first rail 140 for guidance therealong in their travel along said table and then will slide along the second rail 141 with their bound edges guided along said second rail.

The first rail 140 (Figs. 1, 2, 3 and 5) is disposed at the intake end of the trimming table 14 in the line of delivery of the transfer mechanism 13, and serves as a stop or bumper for the books as they are discharged in stacked relationship of two or more books on to said trimming table 14 in a direction transverse to said trimming table. For that purpose, the rail 140 comprises a sheet bent longitudinally to define a back wall 142, a top wall 143 and a bumper deflecting wall 144 inclined downwardly and forwardly as shown more fully in Fig. 3, to deflect the bound forward edges of the books downwardly onto the trimming table 14, as said books move forwardly from the transfer mechanism 13. This rail 140 is mounted on an upstanding flange 145 secured to the edge of the trimming table 14 and is made adjustable up and down thereacross by a screw and elongated slot arrangements 146 (Fig. 1) to adjust the height of said rail with respect to said trimming table and is made adjustable across said table by means of screw bolts 147 (Fig. 3) secured to said rail and passing through respective across slots 148 in said table.

The second rail 141 (Figs. 1, 2 and 15) comprises a plate 150 extending along the front edge of the trimming table 14 and upstanding therefrom and a top wall 151 constituting the web or flange of an angle and defining with said plate and said table a channel to confine the bound rear edges of the books therein, while they are being advanced therealong. This rail 141 is adjustable transversely of the trimming table 14 for the purpose to be described.

The main section of the trimming table 14 up to a region past the first trimming device 16 and near the second trimming device 18 is made up of two longitudinal parts 160 and 161 (Figs. 2, 3, 5, 8, 12 and 13) separated by a space 162 for the reciprocable operation therealong of the conveyor bar mechanism 15 advancing the books along said table. The table part 160 carrying the fixed shear knife (Fig. 2) of the first trimming device 16 is fixed, the rail 141 is adjustable across the trimming table 14 to accommodate for books of different widths, the conveyor bar mechanism 15 is adjustable transverse to the table to an extent and at a rate relative to the adjustment of the rail 141 to maintain the book pushing elements of said conveyor bar mechanism substantially centered with respect to the books, irrespective of adjustments in said rail, and the front table part 161 is adjustable with said conveyor bar mechanism 15 transverse and with respect to the line of the cutting edge of said knife, to maintain the distance between said book pushing elements and the adjoining longitudinal edge of said table part 161 uniform, irrespective of adjustments in the transverse position of said book pushing elements.

For supporting the trimming table 14, there is provided a base 163 (Figs. 1, 5, 8 and 9), frames 164 and 165 (Figs. 1, 8 and 9) secured to said base, a hollow bed 166 (Figs. 1, 2, 8 and 9) on said frames extending along the region of the trimming devices 16, 18 and 19, where the greatest stress is encountered as a result of the trimming operations, an end frame 167 (Figs. 1, 2, 3 and 5) on the intake end of the trimming table secured to said base, stanchions 168 and 169 on said end frame, a cross-piece 170 interconnecting the upper ends of said stanchions, a pair of hollow supports 171 and 172 (Figs. 1, 8, 12, 13, 14, 15 and 16) housing table adjusting mechanisms to be described and seated upon said bed for slide adjusting movements thereacross, as will be more fully described, brackets 173 and 174 secured to said supports and a hollow frame block 176 (Figs. 2, 8, 18 and 19) seated on said bed on the rear side thereof and forming the frame structure for the first trimming device 16. The fixed rear table part 160 (Figs. 2, 3 and 15) carrying the fixed shear knife 17 of the first trimming device 16, is supported at its intake end on the cross-piece 170 and in the region of the first trimming device 16 is connected to the front web 178 of the hollow block 176 (Figs. 2, 8, 18 and 19) in a manner to be described. The front adjustable table part 161 (Figs. 1, 8 and 15) is seated on and secured to the brackets 173 and 174 and at its intake end is slidably supported on the cross-piece 170 (Figs. 2, 3 and 5).

To accommodate the width of the fixed table part 160 to changes in the transverse position of the adjustable table part 161 described, so that the width of the space 162 between said table parts may be made constant irrespective of said changes, said table part 160 is of sectionalized construction and comprises along a portion thereof up to the first trimming device 16, a main rear plate 190 (Figs. 2, 3 and 13) and a series of narrower slats 191 mounted edge to edge and removably secured at one end to the cross-piece 170 by screws 192 and removably secured at their other ends to a series of bars 193 forming the other portion of the table part 160. In front of the first trimming device 16 where the greatest trimming stress is encountered, the table part 160 is made up of the bars 193 (Figs. 2, 8, 13 and 18) which are deeper than the thickness of the plate 191 and slats 192 to afford the necessary strength and rigidity in this region and which are removably secured face to face by means of screws 194 passing through the front web 178 of the hollow frame block 176 and through the bars 193 and threaded into the front bar 193. These bars 193 as well as the top of the front web 178 of the hollow frame block 176 are recessed to receive the ends of the table plate 190 and the table slats 191, and said plate and slats are removably fastened at these ends to said web and said bars by screws 196. Because of the depth of these bars 193, the thickness of the bars is one-half the width of the slats 191, to render said bars light enough for convenient handling.

By means of the sectionalized arrangement shown, the slats 191 and the bars 193 may be added or removed to maintain the required width in the space 162 intervening between the table parts 160 and 161, irrespective of adjustments in the transverse position of the table part 161.

In transferring the books from the infeed table 10 to the trimming table 14 through the mechanism 13, the rear bound edges of the books may catch on the inner edge of the table part 161 bordering the space 162. To prevent this, there are provided two deflecting fingers 197 (Figs. 2 and 3) secured at one end to the table part 160 and raised from said table part 160 at their other ends.

As the books are pushed along the trimming table 14 towards the first trimming device 16 by the operation of the conveyor bar mechanism 15, they are bound to acquire momentum and thereby get out of control. To maintain the advancing books under control and to maintain them along their required course against edgewise turning, there is provided a device comprising a rail 210 (Figs. 2 and 4) secured to the trimming table 14 along its rear edge, a bar 211 in the form of an angle for confining the books down against the table, said bar being secured to brackets 212 mounted on the table and being adjustable thereon to permit changes in the height of said bar above said table, and a leaf brake spring 213 secured to one of said brackets and adapted to press yieldably against the advancing books. An adjusting screw 214 in a holder 215 secured to a bracket 212 bears against the leaf spring 213 for pressure adjusting purposes.

*Conveyor bar mechanism for advancing the books along the trimming table*

The conveyor bar mechanism 15 for advancing the books along the trimming table 14 after they have been deposited on said table by the transfer mechanism 13 is shown more fully in Figs. 1, 2, 5, 8, 10, 11 and 12 and comprises a conveyor bar 220 located below the trimming table 14 along the space 162 and carrying a series of pusher lugs 221, 222 and 223 (three being shown) extending through said space during certain phases of the operation in position to engage respective stacks of books at one end of each stack and advance them along said table towards the first trimming device 16, as the conveyor bar is moved endwise in the same direction. In order to reduce the length of the conveyor bar 220 required, the books are advanced along the trimming table 14 in two steps, as will be more fully described.

The conveyor bar 220 has a four-way motion which comprises a forward endwise movement while in raised position to move the stacked books one step, a downward movement to bring the pusher lugs 221, 222 and 223 below the books, a return endwise movement while in depressed position and an upward movement to raise the pusher lugs through the space 162 into position to engage the books in preparation for their advancement along said table through the next step. With this bar operation, the first pusher lug 221 moves the books from the intake position to an intermediate position, the second pusher lug 222 moves the books from intermediate position to the first trimming station at the trimming device 16 and the third pusher lug 223 pushes the books trimmed at the first trimming station to the second trimming station at the trimming devices 18 and 19 as shown in Fig. 8. The third pusher lug 223 has an elongated slot and screw connection 224 (Fig. 11) with the conveyor bar 220 to permit said lug to be set for different widths of trim or widths of shavings.

For operating the conveyor bar 220 through the four motions described, this bar is carried on two rollers or wheels 226 riding in a channel 227 supported in a manner to be described. The conveyor bar 220 is reciprocated endwise by means of a crank 228 secured to a shaft 230 which is driven from the main drive shaft 72 (Figs. 1 and 10) through bevel gears 231 and 232 between said drive shaft and a shaft 233, and a pair of meshing spur gears 234 between the shafts 230 and 233. The crank 228 is pivotally secured to a rack 235 (Figs. 10 and 12) meshing with a pinion gear 236 secured to a stub shaft 237 supported in a fixed bearing. Also secured to this stub shaft 237 is a gear 238 meshing with a rack 240 confined for endwise movement in a pair of guides 241 secured to the machine bed 166. A finger 242 rigid with the rack 240 engages a fork 243 fastened on the side of the conveyor bar 220. The endwise movement of the rack 240 is thereby transmitted to the conveyor bar 220 and the fork 243 allows the conveyor bar to be adjusted sideways when the machine is set up for books of different width, as will be more fully described.

To impart up and down movement to the conveyor bar 220, there is provided a face cam 250 mounted on a shaft 251 (Figs. 1 and 12) driven from the main drive shaft 72 through a gear 252 on said shaft 251 meshing with a pinion 253 on said drive shaft 72. A yoke follower 255 (Fig. 12) straddling the shaft 251 has a roller and groove engagement with the cam 250 and moves a slide 256 (Figs. 1, 10 and 12) up and down in fixed guideways 257 through a bell crank 258. This slide 256 is pivotally connected to a link 260 having a journal connection with a stud or pin 261 secured to two levers 262 affixed to a rock shaft 263 journalled in the table support 172 housing part of the table adjusting mechanism to be described. The rock shaft 263 has secured thereto a bell crank 265, one arm of which is pivotally connected to the channel 227, the other arm being pivotally connected to a link 266 coupling said bell crank to a similar bell crank 265a having its supporting shaft 263a journalled in the other table support 171 housing part of the table adjusting mechanism, and having one arm connected to the channel 227. This double bell crank arrangement serves to maintain the channel 227 parallel in all its positions.

Through the mechanism described, the conveyor bar 220 is reciprocated endwise along the supporting channel 227 through the operation of the crank 228, and is moved up into position for forward book advancing movement and moved down into position for return inactive movement by means of the cam 250.

The table supports 171 and 172 are movable across the machine bed 166 as a result of mounting means to be described, and since the conveyor bar 220 is connected to said supports through the channel 227, the bell cranks 265 and 265a and the rock shafts 263 and 263a supporting said bell cranks respectively and journalled in said supports, the conveyor bar 220 is therefore made movable with said supports. This permits adjustment in the transverse position of the conveyor bar 220 by movements of the supports 171 and 172. To allow for such adjustments in the positions of the supports 171 and 172 without interrupting the connection between the slide 256 and the channel 227, the pin 261 on which the link 260 is journalled is long and is slidable through said link as the supports 171 and 172 are moved for adjustment.

*Means for adjusting the conveyor bar mechanism and the trimming table for different widths of books*

The knife 17 of the first trimming device 16 bevelled to a horizontal shear edge 275 (Figs. 2, 8 and 18) and across which the front edges of the books are trimmed, is fixed except for slight adjustments with respect to the movable knife of said trimming device. To adjust the back table rail 141 transversely with respect to this knife 17 in accordance with the width of the books to be trimmed and to adjust at the same time the position of the pusher lugs 221, 222 and 223 cross-wise of the trimming table 14 at half the rate of adjustment of the back rail, so as to maintain said lugs in substantially centered position with respect to the books on said table, there is provided adjusting means shown especially in Figs. 1, 13, 14, 15, 16 and 17. This adjusting means comprises the hollow table supports 171 and 172 serving as bearings for the pivot shafts 263 and 263a (Figs. 10 and 12) of the bell cranks 265 and 265a respectively which in turn support the channel 227. The table support 171 is guided for slide movement across the machine bed 166 by means of guides 276 secured to said bed. The other table support 172 is similarly mounted for slide movement on the machine bed 166. For adjustably moving the two table supports 171 and 172 in unison, there is provided a handwheel 277 secured to a shaft 278 which is journalled in bearings on the table support 171 and which carries a worm 280 in said support 171 meshing with a worm wheel 281 affixed to a shaft 282. This shaft 282 is journalled at one end in bearings in the table support 171, extends to the other table support 172 along the front of the machine and at its other end is journalled in bearings in said table support 172. Secured to one end of this shaft 282 in the table support 171 is a gear 283 meshing at the bottom with a rack 284 secured to the table bed 166 by means of screws 285 and meshing at top with a rack 286 rigid with the back table rail 141 for movement therewith by means of a connection to be described. At the other end, the shaft 282 carries a similar gear in the table support 172 meshing with two racks at diametrical opposite sides of said gear, one of said racks being affixed to the machine bed 166, while the other is rigid with the back table rail 141.

The connection between the top rack 286 and the back table rail 141 comprises a stand 290 seated on the top wall of the table support 171 and having a rib 291 extending through a slot 292 in said top wall. The rack 286 is secured to the rib 291 of the stand 290 by means of studs 293, and the base of this stand is confined for slide movement along the top wall of the rail support 171 by the extension of said rib into the slot 292 and also by means of a guide 294 secured to the top wall of the rail support by studs 295. The upper end of the stand 290 has an eye 296 to receive one end of a pin 297 locked in adjusted position therein by a thumb screw 298, the other end of said pin being secured to the web of an angle piece 300 affixed to the back table rail 141.

The extent of adjusting slide movement of the stand 290 along the table support 171 is limited by a front stop 301 and by a rear stop 302 secured to the top wall of the table support and the extent of this adjusting movement is indicated by a scale 303 along the top surface of the guide 294 and a pointer 304 carried by the stand 290.

With respect to the other table support 172 (Figs. 5 and 12), there is a connection between the top rack and the back table rail 141, similar to that described in connection with the table support 171 and similarly comprising the stand 290a secured to said top rack and the pin 297a connecting said stand to the back table rail.

As a result of the arrangement described, as the hand wheel 277 is turned, the top rack 286 associated with the table support 171 as well as the top rack associated with the other table support 172 are moved endwise in unison, and this causes the back table rail 141 to be moved laterally with respect to the cutting edge 275 of the fixed knife 17 of the first trimming device 16. Since the rear bound edges of the books rest against the back table rail 141 in trimming position of the positions, the position of this back table rail with respect to the cutting edge 275 of the fixed knife 17 determines the extent to which the front open edges of the books overlap said cutting edge and therefore the extent of trim to be made. The table rail 140 may be correspondingly adjusted into alignment with the table rail 141 by means of the screw bolts 147 (Fig. 3), in a manner already described.

As the back table rail 141 is adjusted to accommodate for books of different widths, it is desirable to adjust the pusher lugs 221, 222 and 223 to assure proper positioning thereof in substantially centered position with respect to the books. Since the shaft 282 is journalled in bearings in the two table supports 171 and 172, and since the bottom rack 283 associated with the support 171 and the corresponding rack associated with the other support 172 are affixed to the machine bed 166, the rotation of said shaft through manipulation of the handwheel 277, causes the gear 283 in the support 171 and the corresponding gear in the other support 172 secured to said shaft to roll along said fixed racks, thereby moving said supports at the speed of the axis of said shaft. This causes movement of the table supports 171 and 172 at the same rate, which is half that of the top rack 286 associated with the table support 171 and of the corresponding top rack associated with the table support 172. Since the pivot shafts 263 and 263a (Figs. 10 and 12) carrying the bell cranks 265 and 265a are journalled in bearings in the table supports 172 and 171 respectively, and since these bell cranks are connected to the pusher lugs 221, 222 and 223 through the channel 227, the adjusting movement of said table supports is transmitted to the pusher lugs and causes said lugs to move cross-wise of the trimming table 14 half the distance traversed by the back table rail 141.

As the back table rail 141 and the pusher lugs 221, 222 and 223 are adjusted cross-wise of the trimming table 14, the part 161 of said table is also adjusted with said pusher lugs, since said table part is rigidly connected to the table supports 171 and 172 through the brackets 173 and 174 respectively. As a result of this structural tie-up between the table supports 171 and 172 on the one hand and the table part 161 and said pusher lugs 221, 222 and 223 on the other hand, the clearance between the inner edge of the table part 161 along the space 162 and one side of said lugs remains constant, irrespective of adjustments in said pusher lugs. The necessary clearance between the other side of the pusher lugs 221, 222 and 223 and the adjoining edge of the table part 160 may be obtained by adding or removing sections of said table part, in the manner already described.

*Stop means for registering the books at intermediate and first trimming stations*

Means are provided for stopping the books in proper registered position at the intermediate station and at the first trimming station against the possible overrunning effect of momentum on said books. These stop means shown particularly in Figs. 1, 2 and 8 comprise a pair of parallel stop fingers 310 rigidly secured together by a cross-bar 311 and mounted on a rod 312 near its forward end and in position to stop the books at the first trimming station, and a single stop finger 313 secured to said rod intermediate its ends and in position to stop the books at the intermediate station. This rod 312 is held in the free ends of three levers 314 secured to a rock shaft 315 journalled in bearing brackets 316 affixed to the table part 161 as to be adjustable therewith transverse to the fixed cutting knife 17. This rock shaft 315 is operated from a lever 317 which is secured at one end to said rock shaft and which is secured at its other end to a link 318. This link 318 is connected to one arm of a bell crank 320, while the other arm carries a roller 321 in follower engagement with a cam 322 on the shaft 251.

The stop fingers 310 and 313 are adjustable along the supporting rod 312 to suit the lengths of the books being cut.

In the operation of the stop means described, while the pusher lugs 221, 222 and 223 are moving the books forward along the trimming table 14, the rock shaft 315 is turned clockwise from the position shown in Fig. 8, so that the fingers 310 and 313 are raised angularly upwards about the axis of said rock shaft out of the way of the advancing books. Just before the pusher lugs 221, 222 and 223 reach the end of their forward stroke, after the forward lug 223 pushing the books which have been trimmed at the first trimming station has moved forward beyond the position of the fingers 310 in its operation of moving said books into the field of action of the second and third trimming devices 18 and 19, and before the books being advanced by the second pusher lug 222 have reached the position of the fingers 310, the rock shaft 315 is turned by the cam 322 into the position shown in Fig. 8, to bring the fingers 310 and 313 angularly down onto the trimming table 14 in position to stop the books advanced by the pusher lug 222 in registered position opposite the first trimming device 16 and to stop the books advanced by the pusher lug 221 in registered position at the intermediate station.

*Pressure applying means for deflating books before trimming*

A pressure plate 330 (Figs. 1, 2, 8 and 13) is provided at the first trimming station to press down the portions of the books at said station between said bound back edges and the pusher lugs 223 and 222, just before the front open edges of said books are trimmed at said station. This pressure plate 330 is particularly useful to flatten saddle stitched books which have a tendency to be puffed along their bound edges during transit. For that purpose, this pressure plate 330 is supported in the lower arms of bell cranks 331 and 332 through backets 333 affixed to said plate and serving as pivot connections for said lower bell crank arms. The bell cranks 331 and 332 are supported in bearings 334 secured to the table rail 141 for adjusting movement therewith and have their upper arms interconnected by a link 335 to maintain the pressure plate 330 parallel in all its positions. For operating the bell cranks 331 and 332, the right hand bell crank 332 is secured to a rock shaft 336, which is journaled in one of the bearings 334 secured to the table rail 141 as described, and in a fixed bearing 337 secured to the machine bed 166, and which is slidable axially in said fixed bearing to permit endwise adjusting movement of said rock shaft with the pressure plate 330. This rock shaft 336 is operated by a lever 338 clamped to said rock shaft for adjustment therealong, to adjust for different thicknesses of book stacks and pivotally connected at its free end to one end of a link 340, the other end being pivotally connected to one arm of a bell crank 341. The other arm of the bell crank 341 carries a roller 342 in follower engagement with a cam 343 on the shaft 251.

With the arrangement described, as soon as a stack of books has been set in position at the first trimming station and before the movable knife of the first trimming device 16 has been put into motion for trimming action, the pressure plate 330 comes down upon the books along the rear section thereof to press out the air between the leaves of said books and to deflate the books thereby. The pressure plate 330 is raised after the completion of the first trimming operation along the front open edges of the books to permit these books to be advanced to the field of operation of the second and third trimming devices 18 and 19 at the second station.

*Trimming devices*

The three trimming devices 16, 18 and 19 for triming the front open edges of the two end edges (head and tail edges) of the books are similar in construction and operate in a similar manner. The first trimming device 16 alone therefore is described, it being understood that the other two devices 18 and 19 are similar, except where otherwise noted. The trimming device 16 comprises mainly the lower fixed shear knife 17 as described and an upper reciprocable knife 360 (Figs. 1, 8 and 20-23) supported and operated to afford an angle draw cut, so that the combined action of the two knives 17 and 360 is an angle draw and shear cut. As a result, the trimming device 16 will cut book edges of substantial thicknesses with a clean clut.

The trimming device 16 comprises more specifically a fixed frame 361 constituting an integral extension of the hollow frame block 176 (Fig. 8) and is secured to the machine bed 166 through said frame block. A stock 362 (Figs. 1, 8 and 20-23) for carrying the knife 360 slides in an inclined recess 363 in the frame 361 and is slidably retained therein by side guides 364 and 365 secured to said frame by studs 366 to define with said frame inclined slideways for the knife stock. The upper knife 360 is operated by means of the bevel gears 231 and 232 (Figs. 1 and 8) on the shafts 72 and 233 respectively. The shaft 233 is journalled in bearings 367 secured to the underside of the machine bed 166 and at one end has a crank connection 368 with one end of a connecting rod 370, the other end being connected to the free end of a rock lever 371 secured to a rock shaft 372 journalled in bearings 373 in the upper end of the knife frame 361. This rock shaft 372 also rigidly carries a rock lever 374 connected to the knife stock or support 362 by a link 375 to impart to said knife stock a reciprocating motion in an inclined direction along the guides 364 and 365.

The movable knife 360 bevelled to a cutting edge 380 (Figs. 20-23) fits in a recess 381 in the lower end of the reciprocable stock 362 and is retained therein by means of shouldered studs 382 threaded into said knife and passing through slots 383 in said stock elongated to permit adjustments in the position of said knife, both as to the inclination of the cutting edge and its position with respect to the supporting knife stock. This stock 360 is inclined downwardly and forwardly at an angle with the horizontal and with the horizontal cutting edge 275 of the fixed trimming knife 17, and the alignment of its cutting edge 380 with the cutting edge 275 of the fixed knife 17 is assured through adjusting set screws 384 threaded into the knife stock 362 and impinging upon the knife 360.

The guideways defined by the guides 364 and 365 are inclined upwardly and towards the right (Figs. 1, 20 and 21) so that the upper knife 360 during its cutting stroke moves downwardly and towards the left, causing the inclined cutting edge 380 to have a movement with an endwise forward component to effect an angle draw cut and a downward component to cooperate with the lower fixed shear 17 and to effect a shear cut therewith in the manner of a pair of scissors. The upper knife 360 is set to clear barely the bottom shear knife 17 during its cutting stroke.

Since the movement of the upper knife 360 has not only a downward component but also an endwise component with respect to the books being cut, the knife 360 tends therefore to displace the pages of the books edgewise during the cutting operation. To avoid this situation, there is provided a book clamping device comprising a clamp support or carrier 387 in the form of a plate having side runner extensions 388 projecting into grooves or ways 390 in the guides 364 and 365 for guided movement therealong in a direction parallel to the movable knife stock 362. The lower end of this clamp support 387 carries a slidable book clamp shoe 391 in the general form of a channel having a recess 392 therealong to receive a guide rib 393 along the lower edge of the clamp support and slidably held onto said clamp support by means of a gib or cap 394 secured to said support by studs 395 and abutting a flange 396 on said clamp shoe. The clamp shoe 391 is slidable along the lower edge of the clamp support 387 to permit said shoe to be maintained against endwise movement while in book clamping position even though the upper knife 360 is moving for a draw cut and is urged in position shown in Fig. 20 towards the left in elevated inactive position of the upper knife 360 by means of a coil spring 397 connected at its ends to said shoe and the gib or cap 394 respectively.

The clamp support 387 is operated downwardly with the knife stock 362 along their respective parallel slideways during part of the downward cutting stroke of the knife 360 and when the clamp shoe 391 reaches the books, the clamp support is held against further movement along its slideways by the resistance offered by the books. For that purpose, the rock lever 374 (Figs. 1 and 8) secured to the rock shaft 372 is of double arm construction, one arm of which is connected to the knife stock 362 by the link 375 as already described, the other arm being connected to a link 400 which is pivotally connected to a head piece 401 secured to two friction plates 402. These friction plates 402 slide in recesses 403 in the clamp support 387 and are retained therein by means of a pressure plate 404 yieldably held in position against said friction plates by studs 405 threaded into said clamp support and spring leaves 406 flexed between studs and against said pressure plate. The recesses 403 of the clamp support 387 and the pressure plate 404 are faced with suitable brake linings 407, as for example of leather, to increase the frictional pressure.

After the clamp shoe 391 reaches the books, it is necessary for the shoe to be held against endwise movement but to move downward against the books to compress the books, while the upper knife 360 continues its cutting movement across the books along the open front edges thereof. For that purpose, there is secured to one end of the clamp shoe 391 an arm 408 carrying a roller 410 riding along the angular guide surface of a cam 412 secured to one side of the knife frame 361 and having an upper inclined section 413 parallel to the direction of the guide movement of the knife 360 and a lower vertical section 414 located to cause the roller 410 to start moving vertically downward therealong just before the clamp shoe 391 contacts the books. This causes the clamp shoe 391 to continue to travel down at right angles to the books until the pressure on said books limits further downward movement, thereby avoiding edgewise displacement of the books which would occur, if the clamp shoe continues its angular travel. The friction plates 402 and the clamp support 387 causes the clamp shoe 391 to move with the knife 360 during the initial phases of the downward stroke of said knife, and slips while the shoe is being held in clamping position against the books.

The cutting operation described causes the knife 360 to be displaced below the clamp shoe 391. During the upward return stroke of the knife 360, the clamp shoe 391 is lowered into position below the knife 360, as shown in Fig. 23, by means of stops 416 (Fig. 1) secured to the upper ends of the guides 364 and 365 in position to engage the upper end of the shoe support 387 on opposite sides thereof, near the end of said return stroke.

The fixed knife 17 is seated in a recess 420 (Figs. 8, 18 and 19) in the top wall of the hollow frame block 176 and is held in position in said recess by means of bolts 421 passing through said knife and through holes 422 in the top wall of said block and threaded into nuts 423 slidable in respective holes 424 in the front wall of said frame block. The fixed knife 17 may thereby be adjusted in its recess seat when the bolts 421 are loosened, the holes 422 being larger in diameter than the bolts to permit such adjustments.

Just before the pressure plate 330 (Fig. 8) and the clamp shoe 391 contact the books, a side jogger 430 swings into the position shown in Fig. 8 in contact with the untrimmed front open edges of the books to assure their square registration for the cut. This jogger 430 is connected by a support 431 to a rock shaft 432 journalled in bearings 433 affixed to the frame 361 by studs 434. Secured to this rock shaft 432 is an arm 435 pivotally connected to one end of a link 436, the other end being pivotally connected to an arm 437 rigid with a rock shaft 438 mounted in fixed bearings. Also secured to this rock shaft 438 is an arm (not shown) connected to one end of a rod 441, the lower end of which carries a yoke 442 straddling a shaft 443 and carrying a roller 444 in follower engagement with a cam 445 on said shaft 443. This shaft 443 is supported in bearing brackets 447 secured to the base 163 of the machine and is driven from the shaft 72 through a sprocket and chain drive 448 shown in Fig. 9.

The jogger 430 is preferably operated twice into book jogging position during each trimming cycle, once before the front open edges of the books are trimmed, in order to square the books into registry and again after the books are trimmed to square them again into registry before they are moved forward into the field of operation of the second and third trimming devices 18 and 19 at the second station.

The frame block 176 (Fig. 8) supporting the fixed knife 17 is hollow and open at the top and the machine bed 166 is also hollow with a top opening communicating with the hollow of said block. The edge trimmings cut off the books by the trimming device 16 drop through the frame block 176 and into the machine bed 166 and may be carried away by vacuum.

After the books have been trimmed along their front open edges by the trimming device 16 and have been squared by the jogger 430 in the manner described, the conveyor bar mechanism 15 comes into operation moving upwardly after its return stroke, to cause the pusher lug 223 to engage or come close to the lower end edges of the trimmed books at the first trimming station, the pusher lug 222 to engage or come close to the lower end edges of the books at the intermediate station and the pusher lug 221 to engage or come close to the lower end edges of the books at the intake station of the trimming table 14. The conveyor bar mechanism 15 in this condition is then operated forwardly to move the books in the different stations forwardly one step, causing thereby the trimmed books to be advanced from the first trimming station along the trimming table 14 onto the part 455 (Fig. 2) of said table spanning the two trimming devices 18 and 19, the books at the intermediate station to be advanced to the first trimming station and the books at the intake station of the trimming table to be advanced to the intermediate station.

While the books are resting on the part 455 (Figs. 2 and 25) of the trimming table 14, the trimming devices 18 and 19 come into operation to trim the ends of said books. Between the part of the trimming table 14 opposite the first trimming device 16 and the adjacent edge of the table part 455 is a gap 456 to allow the shavings from the trimming device 18 to fall down into the machine bed 166. To lead the books over this gap 456, a pair of hinged plates 457 and 458 (Figs. 2, 10, 13, 14 and 24) is provided spanning said gap and normally held in level position by means of springs. These plates 457 and 458 are depressed upon downward stroke of the knife stock of the second trimming device 18 by means of depressors 460 (Figs. 10 and 24) mounted on the lower end of said knife stock and adapted to engage said plates and swing them open to clear the shavings thereon. Each of these depressors comprises a bar having a pin and elongated slot engagement with the knife stock of the trimming device 18 to permit limited up and down movement of said depressor and carrying a roller of cushion material such as rubber at its lower end. Gravity tends to pull the depressor 460 down in its lowermost position and as the knife stock moves down, the weight of the depressor bearing on the corresponding plate 457 or 458 as a result of the pin and elongated slot connection described, swings said plate open against the action of the spring acting on said plate and allows the shavings to drop through the gap 456.

The second and third trimming devices 18 and 19 located at the second trimming station for the head and the tail cuts respectively, have respective movable knives 360a and 360b (Figs. 24, 25 and 26) provided with cutting edges inclined with respect to the horizontal and supported on knife stocks 362a and 362b respectively. These knife stocks 362a and 362b are guided in inclined frames for reciprocating action therein as in the case of the first trimming device 16. The movable knives 360a and 360b carried by these knife stocks 362a and 362b respectively cooperate with respective fixed knives 17a and 17b and cooperate with respective clamp shoes 391a 391b through friction connections, to hold the books in clamped position against edgewise displacement during cutting action, in a manner described in connection with the trimming device 16.

The second or head trimming device 18 is in fixed position, while the third or tail trimming device 19 can be adjusted to suit the length of the books to be cut. For that purpose, the frame 361b of the third trimming device 19 is secured to a carriage 465 (Figs. 1 and 9) seated on the machine bed 166 and having plates 466 and 467 affixed to the sides of said carriage and flanking said machine bed. These plates 466 and 467 have tongue and slot connections 468 and 470 respectively with the sides of the machine bed 166, to guide the knife carriage 465 in its movement along said machine bed. Along the top of the machine bed 166 in grooves thereof are two parallel racks 471 meshing with two pinions 472 respectively mounted on an adjusting shaft 473 which is journalled in the knife carriage 465 and which has a part 474 projecting from the front of the machine and designed to receive a suitable turning tool. By turning the shaft 473, the third trimming device 19 may be adjusted with respect to the second trimming device 18, while maintaining the knife 360b carried by said trimming device 19 parallel in all its adjusted positions. The fixed knife 17b of the third trimming device 19 is mounted on a support 475 (Figs. 24 and 25) forming part of the carriage 465 of said device and is therefore adjusted in position corresponding to the position of the movable knife 360b, in a manner to be described.

The reciprocating knife motion of the second trimming device 18 is derived from the crank gear 252 (Fig. 1) on shaft 251, having a crank pin 485 connected by a link 370a with a rock lever 371a secured to a rock shaft 372a supported in suitable bearings on the frame of said trimming device. Similarly, in connection with the third trimming device 19, a crank gear 486 (Figs. 1 and 9) is mounted on a stub shaft 487 held in a bearing bracket 488 secured to the side plate 466 of the knife carriage 465 for adjustment therewith and carries a crank pin 489 connected by a link 370b with a rock lever 371b secured to a rock shaft 372b supported in bearings on the frame of said trimming device. The rock lever 371b connects by a pair of links 375b and 400b (Fig. 9) to the knife stock 362b and the friction plates (not shown) of the trimming device 19. A similar double link connection is employed between the rock lever 371a and the knife stock 362a and the friction plates (not shown) of the trimming device 18.

For driving the two crank gears 252 and 486, these gears mesh with the pinion 253 on the drive shaft 72. This pinion 253 is long and is interrupted intermediate its ends to allow for a bearing support 490 for said pinion secured to the underside of the machine bed 166. The section of the pinion 253 to the left of the bearing support 490 (Fig. 1) is long enough to allow the third trimming device 19 to be adjusted for maximum and minimum book sizes without interrupting the drive to said trimming device.

The table part 455 of the trimming table 14 at the second trimming station between the second and third trimming devices 18 and 19 (Figs. 24 and 25) is at a level slightly below the table parts 160, 161 to permit transition of the books from the first trimming station to the second trimming station without catching the books on the edge of the table part 455, and is of sectionalized construction to permit adjustments in the position of the third trimming device 19 with respect to the second trimming device 18. For that purpose, the table part 455 comprises a fixed side section 491 secured to a fixed support 492 for the fixed knife 17a of the second trimming device 18, an intermediate section 493 which is mounted on a pair of parallel rods 494 affixed to said support and which is adjustable therealong by means of sleeves 495 rigid with said intermediate section and slidable therealong and a side section 496 which is secured to the support 475 for the fixed knife 17b of the third trimming device 19 and which therefore is adjustable therewith. The three table sections 491, 493 and 496 are interspaced to permit relative edgewise movement thereof, and when the side table section 496 is moved by the adjustment in the position of the third trimming device 19, the intermediate section 493 may be shifted along the supporting rods 494 to center said section 493 between the flanking side table sections 491 and 496 and may be locked in adjusted center position by means of thumb screws 500 on the rod embracing sleeves 495. The intermediate table section 493 may be replaced by a larger or smaller section, according to the adjustment of the side section 496.

The table part 455 at the second trimming station tilts downwardly and forwardly in conformance with the rest of the trimming table 14, so that the books deposited on said table part tend to slide by gravity forwardly. To gauge the books in proper registered position on the table part 455 as a result of the tilt described, there is provided a rail 510 (Figs. 24 and 25) in alignment with the rails 140, 141 (Fig. 1) extending along the front edge of said table part and serving as a rest for the back bound edges of the books. This rail 510 is in the form of an angle adjustably secured to the intermediate section 493 of the table part 455 through adjustable screws 511 passing through elongated slots 512 in said angle and threaded into said intermediate table section. To limit upward displacement of the books, there is provided a plate 513 constituting the web of an angle piece and spaced above the table part 455 to define therewith and with the rail 510 a channel for confining the back bound edges of the books. This plate 513 is adjustably secured to the rail 510 by means of wing bolts 514 passing through elongated slots.

During transit of the books from the first trimming station to the second trimming station, the books may become puffed. To deflate the books before the head and tail trimming operations are performed, a pressure plate 517 (Figs. 24 and 25) is provided extending between the movable parts of the trimming devices 18 and 19 and movable therewith. This pressure plate 517 has four upright sprindles 518 rigid therewith the passing through guide holes in brackets 520 secured to the clamp shoes 391a and 391b of the trimming devices 18 and 19 respectively and is held yieldably downward by means of coil springs 521 embracing said spindles and extending between said plate and said brackets. As the knives 361a and 361b move downward for trimming action, the pressure plate 517 engaging the books compresses them, thereby forcing out the air between the pages, and holding the books under pressure until the friction clamps 391a and 391b take hold.

On the frame of the third trimming device 19 is a stop 523 (Figs. 9 and 24) to prevent the books from over-running too far beyond the cutting edge of the fixed knife 17b forming part of said trimming device, as the books are transferred from the first trimming station to the second trimming station, and to register the books in a correct position for the final cuts. This stop 523 is mounted in a rock shaft 524 supported in bearings 525 in the frame of the third trimming device 19 and is actuated by a rockable cam 526 supported on a rock shaft 527 journalled in bearings secured to said frame. An arm 528 rigid with the rock shaft 524 carries a roller 529 in follower engagement with the cam 526, and an arm 530 rigid with the rock shaft 527 is connected by a linkage 531 with the rock shaft 372b to operate said cam. This cam 526 is shaped to allow the stop 523 to swing away from the fixed knife 17b of the third trimming device 19 as the movable knife 360b of said device descends, to allow the shavings to drop freely.

Delivery mechanism

After the head and tail edges of the books are trimmed by the mechanism 18 and 19 at the second trimming station constituting also a transfer station, they are picked up by the gripper jaws 20 and 21 (Figs. 9 and 26) of the delivery mechanism 22 and transferred from the part 455 of the trimming table 14 onto the platform 23 of the collecting mechanism 24. The intermediate section 493 (Fig. 25) of the table part 455 has at its rear end a notch 535 to allow the jaw 20 to move into book gripping position from a position below the books. To aid the gripper jaws 20 and 21 in supporting the books in their transition from the second trimming station to the platform 23, there is provided a pair of tracks 536 and 537 (Figs. 25 and 26) at the level of the table part secured to the carriage 465 of the trimming device 19 and to the fixed frame of the machine respectively, and adapted to support the ends of the books being transferred.

In considering Fig. 26 in connection with the delivery mechanism, it must be understood that the view has been turned counterclockwise from the actual view presented by the machine, so that the table part 455 of the trimming table 14 is shown horizontal. Actually, the view should be as shown in Fig. 9, with the table part 455 inclined downwardly towards the right to correspond to the actual machine.

The gripper jaws 20 and 21 are mounted on a trolley 540 (Figs. 9, 26, 27 and 28) carrying four wheels 541 riding in a pair of channel rails 542 secured in fixed position to the frame structure of the machine. This trolley 540 is attached to an endless chain 543 which is trained around a drive sprocket 544 and an idler sprocket 545. The drive sprocket 544 is affixed to a rock shaft 546 carrying a pinion 547 meshing with an upright rack 548. This rack 548 is reciprocated from a slotted lever 550 (Fig. 9) pivoted at one end to a bearing or pivot bracket 551 secured to the base 163 of the machine, and having a crosshead connection 552 with a crank 553 secured to the shaft 443, and a pivotal connection at its free end with the lower end of said rack. This rack 548 is confined in its endwise movements by a guide 554 secured to the machine frame, and as the shaft 443 rotates this rack is reciprocated endwise, causing the trolley 540 to reciprocate along the rails 542.

The upper gripper jaw 21 is fixed to the trolley 540. For that purpose, the trolley 540 has a front flange 556 (Figs. 26 and 28) with a recess 557 to receive therein a mounting flange 558 at one end of the jaw 21. A stud (not shown) passing through an elongated slot in the mounting flange 558 of the jaw 21 is threaded into the trolley flange 556, permitting thereby the height of said jaw to be adjusted, and allowing therefore the gripping of varying thicknesses of books or stacks.

The lower gripper jaw 20 is pivotally supported on the trolley 540 and for that purpose has a knuckle connection with the front end of the trolley comprising a pivot shaft 560 supported in a pair of spaced bearings 561 on said trolley and secured between said bearings to the rear end of said jaw. The gripper jaw 20 is normally urged towards closed book gripping position by means of a spring 562 bearing against a wall 563 of the trolley 540 and against a tail extension 564 on the gripper jaw 20 and supported against lateral displacement by a spindle 565 secured to said trolley wall 563, so as to depend therefrom and passing through said spring and through an elongated opening in said tail jaw extension. For moving the jaw 20 angularly into open position to release the books for deposit upon the collecting platform 23, there is provided a fixed cam 566 in the form of a plate adjustably supported on a fixed frame piece 567 for adjustment therealong to allow for books of different widths and presenting a jaw opening cam surface 568. Supported in a pair of spaced bearings 570 in the rear of the trolley 540 is a pivot shaft 571 having an extension beyond one side of the trolley to which is secured a lever arm 572 carrying at its free end a pair of coaxial rollers 573 and 574. The roller 573 is in line to move into follower engagement with the cam surface 568 of the cam 566, while the other roller 574 is in line to bear against an upright arm 575 affixed to an extension of the pivot shaft 560 of the gripper jaw 20. This lever arm 572 is urged counterclockwise (Fig. 26) about the axis of its pivot shaft 571 by means of a finger 576 affixed to said pivot shaft between its bearings 570 and secured to one end of a tension spring 577, the other end being anchored to a lug 578 secured to the underside of the trolley 540. A stop 580 rigid with the finger 576 engages a pin 581 on the rear wall of the trolley 540 to limit counterclockwise movement of the lever arm 572, when free from the restraining influence of the cam 566.

In the extreme left hand position of the gripper jaws 20 and 21 shown in Fig. 26, the jaw 20 is in open position having previously released the books for deposit upon the collecting platform 23. This gripper jaw 20 is held in open position shown in Fig. 26 by the engagement of the roller 574 carried by the cammed lever arm 572 with the upright arm 575 rigid with said gripper jaw. As the jaws 20 and 21 are moved towards the right (Fig. 26), the other roller 573 carried by the lever arm 572 riding along the inclined section of the cam surface 568, allows said lever arm 572 to swing counterclockwise by the action of the spring 577, and this releases the jaw 20 for counterclockwise rotation under the action of the spring 562 into closed position.

As the jaws 20 and 21 move towards the right (Fig. 26) and approach the books which have been trimmed at the second trimming station on the table part 455, it is necessary for the jaw 20 to move into open position to spread the jaws 20 and 21 relatively apart so as to receive therebetween these books. For moving the jaw 20 into open position for this purpose, there is provided a cam bar 585 located with a cam surface 586 in line with the roller 573 on the lever arm 572 and suspended from a pair of parallel levers 587 and 588 pivotally connected at their free ends to said cam bar. The lever 587 is secured to a rock shaft 590 supported in a bearing in the frame structure of the machine, while the other lever 588 is pivotally supported from this frame structure and serves merely as a radius link to maintain the cam bar 585 parallel in all its positions. The cam bar 585 is lowered into active position to open the jaw 20 and 21 and is raised as soon as the books are received therebetween to move the jaw 20 into closed book gripping position. For this purpose, the rock shaft 590 supporting the lever 587 has secured thereto a lever 591, the free end of which is pivotally connected to the upper end of an upright link 592, the lower end being pivotally connected to a radius lever 593 (Fig. 9) pivotally supported on the bearing bracket 551 and carrying intermediate its ends a roller 594 in follower contact with a cam 596 on the shaft 443.

As the jaws 20 and 21 move to the right (Fig. 26) and approach the books at the second trimming station, the roller 573 on the lever arm 572 riding along the cam surface 586 of the lowered cam bar 585 causes said lever arm 572 to swing clockwise and causes thereby the other roller 574 on said lever arm 572 to engage the upright arm 575 rigid with said jaw and move it clockwise, thereby moving said jaw into open position against the action of the spring 562. At the end of the forward stroke of the jaws 20 and 21 to the right, after the books have been received between said jaws, the cam bar 585 is raised by the action of the cam 596, thereby releasing the lever arm 572 from the confining action of said cam bar and permitting the jaw 20 to move by the action of the spring 562 counterclockwise into closed position to grip the books between the jaws 20 and 21. Bands 597 of cushioning friction material such as rubber, embracing the jaws 20 and 21 serve to effect a firm hold on the books without injuring them. After the boks have been gripped, the jaws 20 and 21 start moving towards the left carrying the gripped books between them, while the cam bar 585 remains in active elevated position. After the jaws 20 and 21 pass beyond the cam bar 585, this cam bar is lowered into cam opening position, in preparation for the next forward stroke of said jaws.

As the jaws 20 and 21 with the books gripped therebetween move over the platform 23, the roller 573 on the lever arm 572 riding along the cam surface 568 of the can 566 causes said lever arm to swing clockwise (Fig. 26) and the other roller 574 on said lever arm to engage the upright arm 575, thereby causing said upright arm to move clockwise against the action of the spring 562 and the jaw 20 rigid with said arm to swing clockwise into open position to release the books. As the released jaws 20 and 21 continue their movement towards the left (Fig. 26) they pass between a pair of strippers 598, which limit the travel of the books so that they will drop on to the shelf 23.

*Book collecting mechanism*

The mechanism 24 for collecting the books before discharge is shown particularly in Figs. 26, 29 and 30 and comprises a shelf or platform 23 extending substantially horizontally, although Fig. 26 shows said shelf tilted at a substantial angle because of the counterclockwise shifting of the view as previously described. This platform 23 is confined for vertical floating movement along a substantially vertical wall 610 on the front side thereof secured to the front edge of a fixed substantially horizontal table 611. The book strippers 598 are adjustably supported on this table 611 by means of a substantially vertical post 613 affixed to said table and carrying near its upper end a cross-rod 614 by means of a clamp collar 615 adjustable along said post. Clamp collars 616 near the ends of the cross-rod 614 and adjustable therealong carry the strippers 598 respectively through rods 617 secured to said strippers and adjustably embraced by said collars. The horizontal positions as well as elevational positions of the strippers 598 can thereby be adjusted.

Mounted along the floating shelf or platform 23 near the rear side thereof for movement therewith is a substantially vertical wall 618 parallel to the fixed front wall 610 and connected to a pair of angle brackets 619 adjustably secured to said table by means of adjusting screws 620 passing through elongated slots in the bases of said brackets, to permit said wall 618 to be adjusted laterally relative to said fixed wall 610 to accommodate books of varying widths. By means of this arrangement, there is provided a magazine for the collected books defined by the parallel fixed wall 610 and the vertically movable wall 618 and by the platform 23 rigid with said movable wall.

The platform 23 is automatically maintained at such a level, that the drop from the jaws 20 and 21 to said platform, if there are no books thereon, or to the top book on said platform remains constant. In order to maintain the same drop as the height of the delivered pile increases, the platform 23 has a swinging mount comprising a pair of parallel lever arms 630 (Figs. 29 and 30) which are connected at one end to a rock shaft 631 journalled in a pair of spaced brackets 632 affixed to the table 611, and which at their free ends are pivotally secured coaxially at 633 to respective stands 634 affixed to the platform 23. Parallel radius links 635 parallel to the lever arms 630 are pivotally connected coaxially at one end at 635a to the brackets 632 respectively and at their free ends are pivotally secured coaxially at 636 to the stands 634. The resulting structure defines a parallel motion mechanism by which the platform 23 remains substantially horizontal in all of its elevational positions.

Before a batch of books is started to be collected upon the platform 23, the platform is in the elevated position shown in dot and dash lines in Fig. 26. After each set of one, two or three books is transferred by the jaws 20 and 21 from the second trimming station 455 to the platform 23, the platform is pushed down one increment corresponding to the thickness of the book set deposited, in preparation for the transfer of the next set. For so depressing the platform 23, there is provided an upright rod 638 (Fig. 26) confined for endwise movement in a guide 640 affixed to the fixed frame of the machine and carrying a book pusher plate 641 at its lower end. This rod 638 is urged upwardly by a spring 642 and is pivotally connected at the upper end to a link 643 which in turn is pivotally secured to one end of a lever 644 pivotally supported intermediate its ends at 645 to the fixed frame of the machine. At its other end, the lever 644 carries a roller 646 pressed into follower engagement with a cam 647 by means of the spring 642. This cam 647 is secured to a shaft 648 driven from the sprocket drive shaft 546 by means of intermeshing gears 649 and 650 on said shafts respectively.

While the jaws 20 and 21 are reciprocating to and from the second trimming station at the table part 455, the pusher plate 641 is in elevated inactive position out of the path of said jaws. As soon as the jaws 20 and 21 reach near their left hand position shown in Fig. 26 and after the books gripped thereby have been deposited onto the platform 23, the pusher plate 641 comes down over the books through the action of the cam 647 into the position shown in Fig. 26, causing thereby the platform 23 to be lowered an amount equal to the amount the books on said platform have been depressed by said plate.

Each time books are deposited on the platform 23 or on previously deposited books thereon, the pusher plate 641 pushes the platform 23 down a distance equal to the thickness of the stack just added. For maintaining the platform 23 in its new position until the next stack of books is added, there is provided a ratchet 660 (Figs. 29 and 30), secured to the rock shaft 631 to which the platform supporting lever arms 630 are connected, and a pawl 661 cooperating with the teeth on said ratchet and pivotally supported at 662 at a fixed axis on a rigid upward extension 663 of one of the fixed brackets 632. This pawl 661 is normally urged into locking engagement with a tooth on the ratchet 660 by spring means 664 and is released in a manner to be described after a predetermined number of books have been collected on the platform 23.

Springs 665 secured to the lever arms 630 respectively and anchored at one end to a fixed frame member 666 urge the platform 23 upwardly, but since the ratchet 660 is rigid with and moves with said lever arms and catches on to the pawl 661, the upward movement of the platform under the action of said springs is limited by said pawl.

In operation, as each stack of books is added on the platform 23, the pusher plate 641 comes down upon the books to move the platform downwardly against the action of the springs 665 a distance equivalent to the thickness of the stack of books added. This downward platform action moves the ratchet 660 clockwise (Fig. 30) about the axis of the rock shaft 631 since this ratchet and the platform supporting lever arms 630 are rigidly interconnected through said rock shaft, causing the teeth on said ratchet to slide idly past the pawl 661. As the pusher plate 641 rises after the completion of its platform pushing operation, the released platform 23 tends to rise under the action of the springs 665 and the ratchet 660 tends to rotate counterclockwise (Fig. 31) but these movements are restrained by the locking engagement of the pawl 661 with said ratchet. The platform 23 is thereby maintained in its new position each time, until another book or stack of books is added on said platform.

In the drawings, the ratchet 660 is shown of split construction comprising two similar sections with their teeth displaced one half a tooth apart, and the pawl 661 is shown of split construction with its sections cooperating with the two ratchet sections respectively. The effect is the same as having a ratchet with twice the number of teeth per unit of length.

After the platform 23 has been unloaded by the discharge action of the post 25, as will be more fully described, the pawl 661 is operated into position to release the ratchet 660, as will also be hereinafter described, thereby permitting the unloaded platform to move upwardly by the action of the springs 665 into starting position shown in dot and dash lines in Fig. 26. To limit the upward movement of the plateform 23, the radius links 635 (Figs. 29 and 30) have respective extensions 667 carrying shoes 668 adapted to engage the table 611 in upper limiting position of the platform and mounted on cushion springs 669 to absorb shock.

Discharge mechanism

After a predetermined number of books have been collected onto the platform 23, the post 25 (Figs. 9, 26, 29, 30 and 31) passing through the slot 26 in said platform and in the table 611 is actuated to push the collected books from said platform towards the right (Figs. 29 and 30) onto the final discharge station 27. This discharge station 27 presents a table which can be elevationally adjusted according to the elevational position of the platform 23.

The discharge mechanism for the purpose indicated comprises a rack bar 670 slidable endwise in a U-shaped channel 671 affixed to the frame structure of the machine. The post 25 is secured to one end of an arm 672, the other end being pivotally connected at 673 to the rack bar 670, so that the post moves with said bar 670 in its endwise movement and at times may swing about the axis of its pivot connection at 673.

The rack bar 670 is reciprocated by means of a rack 675 meshing with a gear 676 mounted on a shaft 677 carrying a gear 678 meshing with the rack teeth 680 of said rack bar. The rack 675 is operated from a lever 681 pivotally connected at one end 682 to said rack and pivotally supported to the frame at its other end. A link 682a pivotally connected at one end to the intermediate section of the lever 681 is pivotally connected at its other end to a crank 683 secured to a shaft 684. The shaft 684 is governed in its operation by a counting mechanism to be described, and makes only one complete revolution, whenever a predetermined number of books have been delivered to the platform 23.

The book delivery post 25 moves towards the right (Figs. 30 and 31), while in elevated position shown, to shove the books towards the discharge table 27 and during its return movement towards the left, is depressed so as not to interfere with the collecting of the next batch of books onto said platform. The mechanism for accomplishing this four way operation comprises an upper level track 685, a lower level track 686, a curved track 687 between said level tracks at one end spaced from the upper level track 685 by a gap 688, and a curved track 690 between said level tracks at the other end spaced from said upper level track 685 by an opening 691 which is normally covered by a spring-pressed trap door 692. The lower end of the post 25 carries a roller 693 adapted to ride along the tracks 685, 687, 686 and 690 in succession.

In operation, while the post 25 is moving towards the right (Figs. 30 and 31) by endwise movement of the rack bar 670, the roller 693 on the post is riding along the upper level track 685, and the post therefore is maintained in elevated book discharging position. The trap door 692 is in closed position shown in Figs. 30 and 31, so that the roller 693 can ride over said door and across the opening 691 at the beginning of the forward book pushing stroke of the post 25 towards the right. When the post 25 reaches the end of its right hand stroke, the roller 693 falls through the gap 688 on to the curved track 687, affording thereby a gradual downward guide for the roller in its movement towards the lover level track 686 at the beginning of the return movement of the post towards the left. While the post 25 is moving towards the left (Figs. 30 and 31) as a result of the corresponding endwise return movement of the rack bar 670, the roller 693 is riding along the lower level track 686 and the post therefore is dropped below the level of the platform 23 in its lowermost possible position when resting on the fixed table 611. As the roller 693 reaches the curved track 690 near the end of its return stroke, it rides along the upward decline afforded by said track to bring the post back to the upper level. As the roller 693 moves along the upper section of the curved track 690, it pushes the trap door 692 open to reach the level of the upper track 685.

Counting mechanism

The book delivery or unloading operation of the pusher post 25 is instituted as soon as a counted number of books have been collected on the platform 23. The counting mechanism controlling this operation is shown in Figs. 30, 32–35 and comprises a ratchet wheel 800 with teeth corresponding in number to the number of stacks of books to be deposited onto the platform 23, before said platform is to be unloaded, so that if two books are trimmed at one time, the ratchet will be advanced one tooth for every two books deposited on to the platform 23 by each stroke of the gripper jaws 20 and 21, and if three books are trimmed at one time, the ratchet will be advanced one tooth for every three books deposited on to said platform by each stroke of the gripper jaws 20 and 21. Therefore, if for example, the machine is to trim two stacked books at each trimming station at the same time, and the ratchet wheel 800 has ten teeth, the platform 23 will be unloaded when twenty books have been collected thereon.

For operating the ratchet 800 step by step, there is provided a pawl 801 pivotally carried by a pivot pin 802 on one arm of a bell crank 803 mounted on a fixed axis, the other arm carrying a roller 804 held in follower engagement with a cam 805 on the shaft 443 (Figs. 9, 30, 32–35) by a spring 806. During each trimming cycle, the bell crank 803 is oscillated through one cycle to move the ratchet 800 the distance equivalent to one tooth thereon.

Due to the imperfect book rejections at the stitcher or other binding machine, the line of books in the trimming machine may be interrupted, so that there may be idle cycles of operation, when no books are being transferred to the platform 23. During such cycles, it is desirable for the ratchet 800 to remain inactive. For that purpose, there is provided a photo-electric system comprising a source of light 807 (Fig. 26) for projecting a beam of light downwardly in the path of the books between the second trimming station at the table part 455 and the platform 23, and through an opening 808 (Fig. 25) in the track 537 adapted to support one end of the books being transferred. A photo-electric cell 809 (Fig. 26) below the opening 808 in the track 537 in position to receive the beam of light from the light source 807 controls a switch in the circuit of a solenoid 810 (Fig. 32) and when activated by the beam of light closes said switch and thereby energizes the solenoid. This solenoid 810 when energized holds the bell crank 803 in position to prevent it from tripping the ratchet 800 one step through the pawl 801 carried by said bell crank. For that purpose, the solenoid plunger 811 is pivotally secured to a lever 812 affixed to a pivot shaft 813 mounted on a fixed axis and carrying a lever 814. This lever 814 has a recess 815 at its free end to receive the projecting end of the pivot pin 802 on the bell crank 803 carrying the pawl 801.

In position shown in Fig. 32, the solenoid 810 is deenergized, and the lever 814 is in limited inactive position against a stop 816 and out of the way of the bell crank 803 and the pawl 801, so that this bell crank is free to trip the ratchet 800 through successive steps. When the solenoid 810 is energized as a result of the failure of transfer of books from the second trimming station to the platform 23, during a period when such transfer would normally occur, the lever 814 will swing clockwise (Fig. 32) while the bell crank 803 is turned counterclockwise by the cam 805 from the position shown in Fig. 32, and the pawl 801 is consequently in raised position. With the lever 814 swung clockwise as described, when the bell crank 803 starts turning clockwise for ratchet tripping operating, the pawl pivot pin 802 carried by said bell crank will seat in the recess 815 of said lever 814, thereby preventing the pawl 801 on said bell crank from tripping the ratchet 800. The pawl 801 will be retained in this inactive position until the next set of books arrive at the second trimming station. A true count is thereby maintained by the operation of the ratchet corresponding to the actual number of books deposited upon the platform 23.

During normal operations, while books are being transferred from the second trimming station to the platform 23, the spaces between successive stacks of books being normally transferred cause the light beam to pass from the light source 807 through such spaces to the photoelectric cell 809 and closes the switch controlling the solenoid 810. It is desirable that during such normal intervals, the solenoid 810 remains inactive, even though the switch in the circuit of said solenoid controlled by the photo-electric cell 809 is closed. In order to time properly the action of the solenoid 810, there is provided a switch 817 (Fig. 32) operated from a cam 818 on the shaft 443 and a spring-pressed lever 819 with a roller 820 in follower engagement with said cam and controlling said switch. The cam 818 has a notch 821 into which the follower roller 820 drops during the intervals when books should be passing over the opening 808 (Fig. 25) in the path of the light beam in the photo-electric scanning system to close cyclically the switch 817. At all other times, the switch 817 is open.

The switch 817 is in the circuit of the solenoid 810 in series with the switch operated from the photo-electric cell 809, so that both switches must be closed before the solenoid can be energized. Therefore, if during the interval when books should be passing over the opening 808 and when the switch 817 is closed, no books are passing, then the closing of the other switch controlled from the photo-electric cell 809, energizes the solenoid 810 and renders the counting ratchet tripping mechanism described inactive. The location of the switch closing notch 821 in the cam 818 is such that the solenoid 810 cannot act until the bell crank 803 is turned counterclockwise (Fig. 32) in up position of the pawl 801.

After the ratchet 800 has been tripped through successive steps corresponding to the number of teeth thereon, and has completed one revolution, the post 25 is operated along the platform 23 to discharge the books therefrom. For effecting this operation, the ratchet 800 has a series of teeth 825 of normal depth and two successive deeper teeth 826. The first deep tooth 826 initiates movement of the post 25 in elevated position along the platform 23 for discharge and the second tooth initiates return movement of the post in depressed position. For that purpose, supported on the shaft of the ratchet wheel 800 for free rotation with respect thereto and suspended therefrom is a lever 827 adapted to engage an electric spring-pressed push button 828 controlling a switch 830 in the circuit of a solenoid 831 (Fig. 35). The hub of this lever 827 has a notch 832 into which the pawl 801 extends when it engages a deep tooth 826 of the ratchet 800. When the pawl 801 engages a shallow tooth 825 of the ratchet, it is free of the lever notch 832, and the lever 827 therefore hangs down loosely without pressing on the switch button 828. Under there conditions the switch 830 is open and the solenoid 831 is deenergized. When the ratchet wheel 800 reaches the position in which the pawl 801 engages the first of the deep teeth 826, the pawl reaches into the notch 832 of the lever 827 and thereby swings the lever counterclockwise (Fig. 32) against the push button 828. This closes the switch 830 and energizes the solenoid 831.

The solenoid 831 when energized controls the book discharging movement of the post 25. For that purpose there is secured to the shaft 443 a one tooth ratchet 840 fastened to said shaft for continuous rotation therewith, a disc 841 mounted loosely on said shaft but normally held against rotation by a brake (not shown) and a spring-pressed pawl 842 mounted on said disc. Rigid with the disc 841 is a bevel pinion 843 (Fig. 30) meshing with a bevel gear 844 on the crank shaft 684 (Fig. 30). The ratio of the pinion 843 to the gear 844 is two to one, so that it takes two revolutions of the pinion 843 to revolve the crank shaft 684 one full turn. This is the reason for the two deep teeth 826 on the ratchet 800, each of these teeth controlling one half a revolution of the crank shaft 684, and controlling thereby the respective strokes of the discharge post 25 back and forth through a single cycle.

Normally, the pawl 842 is held out of locking engagement with the one tooth ratchet 840. For that purpose, there is provided a walking beam 846 pivotally supported at 847 on a fixed axis, and having one end pivotally connected to the plunger 848 of the solenoid 831, and the other end pivotally connected by a link 849 to a double radius link 850, pivoted at 851 on a fixed axis. Through a link 852, pivotally secured at its ends at 853 and 854, the double radius link 850 operates a lever 855 pivotally supported at one end at 856 on a fixed axis and carrying intermediate its ends a roller 857.

The solenoid 831 in Fig. 35 is shown in energized condition resulting from the engagement of the pawl 801 with a deep tooth 826 of the ratchet 800. However, during normal operation and before the count has been completed, the pawl 801 engages a shallow tooth 825. Under these conditions, the solenoid 831 is deenergized and a spring 860 pulls the walking beam 846 counterclockwise from the position shown. This turns the double radius link 850 counterclockwise until the pivot connections at 851, 853 and 854 are in alignment. This raises the roller 857 into engagement with the pawl 842 and prevents said pawl from engaging the tooth of the ratchet 840. When the ratchet 800 has reached a position in which the pawl 801 engages the first of the deep teeth 826, the solenoid 831 is energized as described and the linkage mechanism 846, 850, 852 and 855 is operated into position shown in Fig. 35. This moves the roller 857 out of engagement with the pawl 842, and causes the released pawl to move under spring action into engagement with the tooth of the ratchet 840 when said ratchet tooth reaches said pawl during the rotation of said ratchet. This locks the disc 841 and the shaft 443 for clockwise rotation (Fig. 35) in unison and thereby causes the crank shaft 684 (Fig. 30) to rotate half a revolution. This in turn moves the rack bar 670 (Fig. 30) towards the right and consequently moves the post 25 towards the right to discharge the books from the platform 23 as described. The next step of the ratchet 800 (Fig. 32) moves the pawl 801 into engagement with the next deep tooth 826 of the ratchet and maintains the solenoid 831 (Fig. 35) energized, so that the roller 857 remains in position shown in Fig. 35, thereby permitting the shaft 443 to rotate through another revolution. This causes the crank shaft 684 (Fig. 30) to rotate through the remaining half revolution, driving the rack bar 670 towards the left for return stroke and causing thereby the post 25 to return towards the left but depressed position so as not to interfere with the transfer of books on to the platform 23 for the start of the next batch as already set forth. When the ratchet 800 (Fig. 32) is turned into the next step position in which the pawl 801 engages the first shallow tooth 825, the solenoid 831 (Fig. 35) is deenergized and the roller 857 is raised into position to inactivate the pawl 842. The pawl 842 remains in this inactivated position, and the discharge post 25 stops in position shown in Fig. 30, until the count for the next pile of books on the platform 23 has been completed.

As previously described, the platform 23 is depressed step by step as books are delivered thereto and each time is maintained in new position by the engagement of the pawl 661 (Figs. 29 and 30) with the ratchet 660 secured to the platform supporting rock shaft 631. The pawl 661 must be maintained in active relation to the ratchet 660 during the count too lock the platform 23 against upward movement from its new position attained each time after the delivery of a stack of books thereto, and must be released after the count has been finished and the post 25 has completed its book discharging stroke towards the right (Fig. 30), in order to allow said platform to move upwardly by the action of the springs 665 into starting position for the next count. For that purpose, there is provided an upright rod 870 pivotally connected at its upper end to a tail extension of the pawl 661 by a pin and arcuate slot connection 872 and pivotally connected at its lower end to the intermediate section of a lever 873 having one end pivotally secured to one of the fixed brackets 632 and carrying at its other end a roller 874 engaging the upper smooth side of the rack bar 670. This bar 670 has an upper cam edge comprising a straight section 875 supporting the rod 870 in elevated position shown in Fig. 30, in which position, the pawl 661 is engaging one of the teeth of ratchet 660 and is consequently locked against downward movement, and a depression 876 near one end into which the roller 874 drops when said bar reaches near the end of its stroke towards the right for book discharging operations. The dropping of the roller 874 into the depression 876 causes the pawl 661 to swing clockwise (Fig. 30) out of engagement with the ratchet 660, thereby permitting the platform 23 to be moved upwardly into initial position shown in dot and dash lines in Fig. 26 in preparation for the collection of the next counted batch of books. As the bar 670 is returned towards the left (Fig. 30), the roller 874 is again raised into engagement with the straight cam section 875 of the bar, causing thereby the pawl 661 to resume locking cooperation with the ratchet 660.

While the invention has been described with particular reference to a specific embodiment, it is to be understood that it is not to be limited thereto, but is to be construed broadly and restricted solely by the scope of the appended claims.

What is claimed is:

1. In a book handling machine of the type having a transfer station for receiving the books singly in succession or in successive stacks, the combination comprising a collecting platform, means for transferring the books singly in succession or in successive stacks from said transfer station to said platform through successive cycles, and for piling the books on said platform, counting means operable in synchronism with the transfer cycles for registering the number of transfer cycles, book sensing means operable automatically upon failure to transfer a book or books during a transfer cycle to render said counting means inoperative for that cycle, whereby said counting mechanism registers only in accordance with actual books transferred, and means for automatically unloading said platform when said counting means registers a predetermined number of transfer cycles.

2. In a book handling machine of the type having a transfer station for receiving books singly in succession or in successive stacks, the combination comprising a collecting platform, means for transferring the books singly in succession or in successive stacks from said transfer station to said platform through successive cycles, and for piling the books on said platform, counting means comprising a ratchet and pawl device operable in synchronism with the transfer cycles for registering the number of transfer cycles by the number of teeth through which the ratchet has been advanced by the action of the pawl, book sensing means operable automatically upon failure to transfer a book or books during a transfer cycle to render the pawl inoperative for ratchet advancing operation for the cycle, whereby the ratchet registers only in accordance with actual books transferred, and means for automatically unloading said platform, when said ratchet reaches a predetermined rotative position.

3. In a book handling machine of the type having a transfer station for receiving books singly in succession or in successive stacks, the combination comprising a collecting platform, means for transferring the books singly in succession or in successive stacks from said transfer station to said platform through successive cycles and for piling the books on said platform, counting means operable in synchronism with the transfer cycles for registering the number of transfer cycles, and comprising a solenoid, means operable when said solenoid is energized for rendering said counting means inoperative for that cycle, a pair of switches in series in the circuit of said solenoid, photo-electric means operable in response to a light beam passing through the path of the books between said trimming station and said collecting platform for closing one of said switches when said light passes through said path unobstructed by the passage of books therealong, and means for closing the other switch during the period of each cycle when the books should normally be passing across the path of said light beam, whereby upon the passage of the light beam during said period through the path of the books unobstructed, said solenoid is energized and said counting means rendered inoperative, and means for automatically unloading said platform when said counting means registers a predetermined number of transfer cycles.

4. In a machine for operating on books, a transfer station, a collecting station, means for transferring the books from said transfer station to said collecting station and comprising a pair of opposed book gripping jaws, one of said jaws being pivotally mounted for movement into open and closed position in relation to the other jaw, spring means urging said movable jaw towards the other jaw into closed book gripping position, means for reciprocating said jaws together between said stations, a cam bar reciprocable between operative position and inoperative position, a follower for said cam bar rigid with said movable jaw for pivotal movement therewith, said cam bar in operative position having a cam surface in line with said cam follower to cause said cam follower to ride along said cam surface as said jaws move towards said transfer station and to cause thereby said movable jaw to move into open position against the action of the spring means, said cam bar in inoperative position having its cam surface out of line with said cam follower, to allow said movable jaw to move into closed position under the action of said spring means, means for reciprocating said cam bar cyclically between said operating position and inoperative position in time relation with the means for reciprocating said jaws, to cause said cam bar to be in operative position as said jaws reach the vicinity of said transfer station, whereby said movable jaw is moved into open position and said jaws are permitted to flank opposite faces of the book or books at said transfer station, and to cause said cam bar to be moved into inoperative position when said jaws are in said book flanking position, to allow said movable jaw to move under the action of said spring means into closed position to seize the book or books between said jaws, and means for moving the movable jaw into open position against the action of said spring means as said jaws reach the vicinity of said collecting station, to release the seized book or books for deposit at said collecting station.

5. In a machine for operating on books, the combination as described in claim 4, wherein the means for reciprocating said cam bar between operative and inoperative positions comprises a pair of parallel levers connected at one end to respective pivot supports and pivotally connected at their other free ends to said cam bar at spaced sections thereof, whereby said cam bar is suspended for parallel movement, and drive means for oscillating one of said levers about its pivot support in time relation with the means for reciprocating said jaws.

6. In a machine for operating on books, a collecting platform mounted for downward movement from a predetermined initial loading position, means for cyclically delivering books to said platform singly in succession or in successive stacks, said platform being lowered step by step from said initial loading position as the books or stacks of books are transferred successively thereto, means for counting the number of transfers made on said platform, means responsive to said counting means and operable automatically when a predetermined number of transfers have been made and independently of the level of said platform for automatically discharging the books as a single batch from said platform, and means for raising said platform from discharge position to said initial loading position automatically after discharge of the books from said platform, independently of the position of said platform in discharge position.

7. In a machine for operating on books, a transfer station, a collecting station including a platform, means for cyclically transferring the books from said transfer station to said collecting station singly in succession or in successive stacks, and comprising a pair of opposed book gripping jaws, means for reciprocating said jaws between said stations, and means for relatively closing said jaws when said jaws reach said transfer station to seize a book or books at said transfer station and for relatively opening said jaws when said jaws reach said collecting station to release the seized book or books for deposit on said platform at said collecting station, means for counting the number of transfers made on said platform, and means responsive to said counting means and automatically operable when a predetermined number of transfers have been made for discharging the books from said platform without interrupting the operation of said book transferring means.

8. In a machine for operating on books, a transfer station, a collecting station including a collecting platform mounted for floating downward movement, means for cyclically transferring the books from said transfer station to said collecting station singly in succession or in successive stacks, and comprising a pair of opposed book gripping jaws, means for reciprocating said jaws between said stations, and means for relatively closing said jaws when said jaws reach said transfer station to seize a book or books at said transfer station and for relatively opening said jaws when said jaws reach said collecting station to release the seized book or books for deposit on said platform at said collecting station, means for lowering said platform down a distance substantially equal to the thickness of the book or books added at each transfer cycle, means for locking said platform against upward movement from each new position thereof, means for automatically discharging the books as a single batch from said platform after a predetermined number of books have been delivered to and collected on said platform independently of the level of said platform and without interrupting the operation of said book transferring means, and means for releasing said locking means automatically after discharge of the books from said platform and independently of the level of said platform, without interrupting the operation of said book transferring means, to permit said platform to rise to its initial position for the collection of a new batch of books thereon.

9. In a book handling machine of the type having a transfer station for receiving books singly in succession or in successive stacks, the combination comprising a collecting platform having a slot extending thereacross, a discharge post extending from below said platform through said slot, means for transferring the books singly in succession or in successive stacks from the transfer station to said platform and for piling the books on said platform, means automatically operable when a predetermined number of books have been piled on said platform for moving said post from an initial inoperative position on one side of the books collected on said platform along said slot and across said platform to a discharge position and for thereby discharging the piled books as a single batch on to a discharge station, and comprising means for supporting said post in elevated position in which said post projects above said platform while said post is moving from initial position to discharge position, to engage the books on said platform for discharge, and means for returning said post to said initial position after a book discharge operation and comprising means for depressing said post below said platform and for supporting the post in depressed position, while said post is returning to said initial position, so as not to interfere with the collecting of the next batch of books onto said platform.

10. In a machine for operating upon books, a collecting platform, a parallel motion mechanism supporting said platform for downward movement while maintaining said platform substantially parallel to all its positions, said parallel motion mechanism being out of dead center position throughout the full range of downward movement of the platform, whereby said platform can be moved down from its uppermost empty position by application of downward pressure directly thereon, spring means urging said platform upward and having sufficient force to move the platform to its uppermost position when empty, means for cyclically delivering books to said platform singly in succession or in successive stacks after they have been operated upon, means for pushing the book or books deposited on to said platform downward after each delivery cycle a distance substantially equal to the thickness of said book or books, to cause said platform to be lowered against the action of said spring means a corresponding distance to a new position, means for releasably locking said platform against upward movement in the new position reached at the end of each delivery cycle, means for counting the number of deliveries made to said platform, means responsive to said counting means for automatically discharging the books as a single batch from said platform after a predetermined number of deliveries have been made to said platform, and means for releasing said locking means automatically after discharge of the books from said platform to permit said platform to rise to its initial position under the action of said spring means for the collection of a new batch of books thereon.

11. In a machine for operating on books, a collecting platform mounted for floating downward movement, means urging said platform upward and having sufficient force to move the platform to its uppermost position when empty, means for cyclically delivering books to said platform singly in succession or in successive stacks, means for lowering said platform down a distance substantially equal to the thickness of the book or books added at each delivery cycle, means for locking said platform against upward movement from each new position thereof, means for counting the number of deliveries made to said platform, means responsive to said counting means for automatically discharging the books as a single batch from said platform after a predetermined number of books have been delivered to and collected on said platform, and means for releasing said locking means automatically after discharge of the books from said platform to permit said platform to rise to its initial position for the collection of a new batch of books thereon under the action of said urging means.

12. In a machine for operating on books, a collecting platform mounted for floating downward movements, means for cyclically delivering books to said platform singly in succession or in successive stacks, spring means urging said platform upwardly and having sufficient force to move the platform to its uppermost position when empty, means for lowering said platform a distance substantially equal to the thickness of the book or books added at each delivery cycle to a new position against the action of said spring means, ratchet and pawl means for locking said platform each time in new position against the action of said spring means, said ratchet and pawl means permitting the lowering of said platform, means for counting the number of deliveries made to said platform, means responsive to said counting means for automatically discharging the books as a single batch from said platform after a predetermined number of books have been delivered and collected on said platform, and means for releasing the pawl from locking engagement with the ratchet automatically after discharge of the books from said platform, to permit said platform to rise to its initial position under the action of said spring means for the collection of a new batch of books thereon.

13. In a book handling machine of the type having a transfer station for receiving books singly in succession or in successive stacks, the combination comprising a collecting platform, means for transferring the books singly in succession or in successive stacks from said station to said platform, so as to rest directly on said platform and for piling the books on said platform, means for depressing said platform from an initial position one step as each book or stack of books is delivered to said platform, means for counting the number of transfers made to said platform, means responsive to said counting means and automatically operable when a predetermined number of books have been piled on said platform for discharging the piled books as a single batch sidewise and edgewise from said platform on to a discharge station, and means automatically operable after said batch of books has been discharged from said platform for elevating said platform to said initial position.

14. In a book handling machine of the type having a transfer station for receiving books singly in succession or in successive stacks, the combination comprising a collecting platform having a slot extending thereacross, a discharge post extending from below said platform through said slot and supported in a definite elevational position, means for transferring the books singly in succession or in successive stacks from the transfer station to said platform so as to rest directly on said platform and for piling the books on said platform, means supporting said platform for downward movement at each delivery to an extent equal to the thickness of the delivery relative to said post while said post remains in said definite position, means automatically operable when a predetermined number of books have been piled on said platform and said platform has been lowered by said books for moving said post from said definite position along said slot and across said platform and for thereby discharging the piled books as a single batch from said platform on to a discharge station.

15. In a machine for operating upon books, a collecting platform, a parallel motion mechanism supporting said platform for downward movement while maintaining said platform substantially parallel to all its positions, comprising a lever arm, a rock shaft connected to one end of said lever arm, the other end having a pivotal connection with said platform, a radius link parallel to said lever arm and having a pivotal support at one end and a pivotal connection with said platform at the other end, spring means urging said platform upward, means for cyclically delivering books to said platform singly in succession or in successive stacks after they have been operated upon, means for pushing the book or books deposited onto said platform downward after each delivery cycle a distance substantially equal to the thickness of said book or books, to cause said platform to be lowered against the action of said spring means a corresponding distance to a new position, and means for releasably locking said platform against upward movement in the new position reached at the end of each delivery cycle, comprising a pawl member and a ratchet member, one of said members being connected to said rock shaft for movement therewith, the other member having a fixed pivotal support for cooperative engagement with the member connected to said rock shaft.

16. In a machine for operating upon books, a collecting platform, a parallel motion mechanism supporting said platform for downward movement while maintaining said platform substantially parallel to all its positions, comprising a fixed table, a bracket secured to the upper side of said table, a rock shaft journalled in said bracket, a stand affixed to said platform on the upper side thereof, a lever arm member secured at one end to said rock shaft and pivotally mounted at its other end to said stand, and a radius link member parallel to said lever arm and pivotally connected at one end to said bracket and pivotally connected at its other end to said stand, spring means urging said platform upward, means for cyclically delivering books to said platform singly in succession or in successive stacks after they have been operated upon, means for pushing the book or books deposited onto said platform downward after each delivery cycle a distance substantially equal to the thickness of said book or books, to cause said platform to be lowered against the action of said spring means a corresponding distance to a new position, and means for releasably locking said platform against upward movement in the new position reached at the end of each delivery cycle.

17. In a machine for operating upon books, the combination comprising a collecting platform, a parallel motion mechanism supporting said platform for downward movement while maintaining said platform substantially parallel to all its positions and including a fixed table, a lever arm member, and a radius link member parallel to said lever arm member, said members being pivotally connected at one end to said platform and being pivotally connected at the other end to said table, spring means urging said platform upward towards uppermost limiting position, a limiting shock member rigid with one of said parallel members and adapted to engage said table when said platform reaches said uppermost position to limit said uppermost position and to absorb the shock of stopping said platform in said uppermost position, means for cyclically delivering books to said platform singly in succession or in successive stacks after they have been operated upon, means for pushing the book or books deposited onto said platform downward after each delivery cycle a distance substantially equal to the thickness of said book or books, to cause said platform to be lowered against the action of said spring means a corresponding distance to a new position, and means for releasably locking said platform against upward movement in the new position reached at the end of each delivery cycle.

18. In a machine for operating upon books, the combination as described in claim 15, wherein the ratchet member is secured to the rock shaft and the pawl member is supported on a fixed axis and is spring-pressed against the teeth of said ratchet.

19. In a machine for operating upon the books, the combination as described in claim 16, wherein there is provided an extension on one of said members beyond its pivot support on said bracket carrying a cushioning shoe adapted to engage said table in upper position of the platform to limit said position and to absorb the shock of stopping said platform in said limiting position.

References Cited in the file of this patent

UNITED STATES PATENTS

| Number | Name | Date |
|---|---|---|
| 182,994 | Dooley | Oct. 10, 1876 |
| 687,281 | Spalckhaver | Nov. 26, 1901 |
| 1,076,726 | Welch | Oct. 28, 1913 |
| 1,084,006 | Gray | Jan. 13, 1914 |
| 1,112,543 | Love | Oct. 6, 1914 |
| 1,117,244 | Richards | Nov. 17, 1914 |
| 1,219,589 | Schaffer | Mar. 20, 1917 |
| 1,352,492 | Winkley | Sept. 14, 1920 |
| 1,504,521 | Seybold | Aug. 12, 1924 |
| 1,515,013 | De Costa | Nov. 11, 1924 |
| 1,661,969 | Semashko | Mar. 6, 1928 |
| 1,761,632 | Koehler | June 3, 1930 |
| 1,845,203 | Sibley | Feb. 16, 1932 |
| 1,937,576 | Kast et al. | Dec. 5, 1933 |
| 2,017,462 | Kleineberg | Oct. 15, 1935 |
| 2,065,674 | Fay | Dec. 29, 1936 |
| 2,071,123 | Hubelmeyer | Feb. 16, 1937 |
| 2,108,457 | Tobia | Feb. 15, 1938 |
| 2,167,045 | Hooper | July 25, 1939 |
| 2,517,675 | Keller | Aug. 8, 1950 |
| 2,562,938 | Moyer | Aug. 7, 1951 |
| 2,562,950 | Roessl et al. | Aug. 7, 1951 |
| 2,646,982 | Hendrix | July 28, 1953 |
| 2,670,090 | Crawley et al. | Feb. 23, 1954 |
| 2,699,264 | Bruce et al. | Jan. 11, 1955 |